(12) United States Patent
Umeya et al.

(10) Patent No.: US 7,703,672 B2
(45) Date of Patent: Apr. 27, 2010

(54) ELECTRONIC MONEY MANAGEMENT SYSTEM, ELECTRONIC MONEY MANAGEMENT METHOD AND COMPUTER PROGRAM

(75) Inventors: Masaru Umeya, Tokyo (JP); Aritomo Sakamoto, Tokyo (JP); Kazumasa Miyazawa, Tokyo (JP); Koji Ito, Tokyo (JP); Makoto Yamada, Tokyo (JP); Nobumitsu Ukai, Tokyo (JP); Takashi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 1053 days.

(21) Appl. No.: 10/554,726

(22) PCT Filed: Apr. 30, 2003

(86) PCT No.: PCT/JP03/05513

§ 371 (c)(1),
(2), (4) Date: Oct. 28, 2005

(87) PCT Pub. No.: WO2004/097701

PCT Pub. Date: Nov. 11, 2004

(65) Prior Publication Data

US 2007/0034684 A1 Feb. 15, 2007

(51) Int. Cl.
*G06K 5/00* (2006.01)
(52) U.S. Cl. .................................... 235/380
(58) Field of Classification Search ............... 235/380; 705/35–45
See application file for complete search history.

(56) References Cited

U.S. PATENT DOCUMENTS 6,039,250 A 3/2000 Ito et al. ............ 235/380
6,338,048 B1 * 1/2002 Mori ................. 705/41
6,402,027 B1 6/2002 Sasaki ............... 235/379

(Continued)

FOREIGN PATENT DOCUMENTS

EP 0806747 11/1997

(Continued)

OTHER PUBLICATIONS

Patent Abstracts of Taiwan, publication No. 494364B, publication date Jul. 11, 2002.

*Primary Examiner*—Daniel A Hess
(74) *Attorney, Agent, or Firm*—K&L Gates LLP

(57) ABSTRACT

An internet N is connected to an electronic money management server 10 so that communications can be performed with a deposit money terminal device 30 replenishing an electronic money for an user card comprised by recording a card ID and an issuer ID, a member shop terminal device 50 reducing the electronic money utilized from the user card, and the like. The electronic money management server 10 acquires the deposit money amount and the issuer ID from a deposit money terminal device 30 at the replenishment time of the electronic money, and totalizes the deposit money amount for each issuer, and performs the delivery of the cash for the totalized deposit money amount to the issuer. Further, the electronic money management server 10 acquires the utilized amount and a member shop ID and an issuer ID from a member shop terminal device 50 at the utilizing time of the electronic money, and totalizes the utilized amount for each issuer and member shop, and performs the delivery of the cash for the totalized utilized amount between the issuer and the shop.

7 Claims, 18 Drawing Sheets

U.S. PATENT DOCUMENTS 6,487,542 B2 * 11/2002 Ebata et al. .................. 705/69

FOREIGN PATENT DOCUMENTS

| | | |
|---|---|---|
| EP | 0993731 | 8/1999 |
| EP | 1197927 | 4/2002 |
| EP | 1221669 | 7/2002 |
| EP | 1197927 | 1/2004 |
| JP | 09-002539 | 1/1997 |
| JP | 10-000010 | 1/1998 |
| JP | 10-143589 | 5/1998 |
| JP | 11-272763 | 10/1999 |
| JP | 2000-207509 | 7/2000 |
| JP | 2001-034695 | 2/2001 |
| JP | 2001-222763 | 8/2001 |
| JP | 2001-306977 | 11/2001 |
| WO | 9803943 | 1/1998 |

* cited by examiner

ELECTRONIC MONEY MANAGEMENT SYSTEM, ELECTRONIC MONEY MANAGEMENT METHOD AND COMPUTER PROGRAM

CROSS-REFERENCE TO RELATED APPLICATIONS

This application is a U.S. national stage application of International Application No. PCT/JP2003/005513, filed Apr. 30, 2003, and published in a non-English language.

BACKGROUND OF THE INVENTION

1. Technical Field of the Invention

The present invention relates to an electronic money management system, which provides environment where electronic money independently issued by plural issuers is arbitrarily replenished and made usable at shops.

2. Prior Art

The electronic money can deal with even low value payment which is difficult for a credit card, and has attracted attention as a scheme to reduce inconvenience of handling cash on hand and a risk of hand-carrying cash. In such a usage mode of electronic money, there are considered various types. Here, the [electronic money] is referred to as money representing a monetary value by digital data, and the [issuer] is referred to as the issuing organization (corporate organization, business enterprise, and the like) of such electronic money.

For example, in the case of the electronic money of a prepaid type using an IC card, the IC card owned by an user is recorded with a predetermined amount of the electronic money in advance, and this card can be suitably used at the shop (to spend the monetary value represented by the electronic money by changing it into cash, and so on). The IC card is replenished with the electronic money of the monetary value corresponding to cash inputted into a specific electronic money replenishing device by the user.

In general, the IC card is issued by each issuer. Usually, the electronic money replenishing device and the electronic money reduction device to reduce the electronic money recorded in the IC card are also installed by each issuer. When issuing the IC card, a card ID unique to that IC card is given, and this is managed by the issuer side. The issuer also manages an issue amount of the electronic money issued through the electronic money replenishing device.

When the IC card is issued by each issuer and the electronic money replenishing device is independently installed, there occurs an inconvenience in which the user of the electronic money is unable to replenish the electronic money by using the electronic money replenishing device of a different issuer. Further, shop receiving payment by the electronic money, for example, a department store, a restaurant, an automatic vending machine, and the like is required to be installed with a specific electronic money reduction device by each issuer, and this causes a problem that the cost thereof is increased.

A main object of the resent invention is to provide a scheme for making the replenishment of the electronic money independently issued by plural issuers and the utilization of the electronic money by the user easy.

SUMMARY OF THE INVENTION

To solve the above described problem, the present invention provides a computer program for performing an electronic money management system, an electronic money management method and such a management method by using a computer.

The electronic money management system of the present invention is a system connected to a portable recording medium comprised by recording medium identification information to identify itself and issuer identification information to identify the issuer of the electronic money through one or plural electronic money replenishing means to replenish the electronic money of the instructed monetary value portion through communication path, and the system is characterized by comprising: information acquiring means of acquiring the medium identification information on the recording medium of the replenishing target, the issuer identification information, and the replenishment information on the electronic money from any of the electronic money replenishing means through the communication path; and deposit money management means of specifying an issuer based on the issuer identification information from among pieces of the information acquired by this information acquiring means, and specifying monetary value corresponding to the electronic money to be replenished based on the replenishment information on the electronic money, and at the same time, totalizing this monetary value for each specified issuer, and performing the delivery of the totalized monetary value to the issuer.

The replenishment information on the electronic money is referred to as information to specify the fact of replenishment and its monetary value. By the electronic money management system having such a constitution, even if the electronic money is different for each issuer, it can be replenished in arbitrary recording medium, and moreover, it can be guaranteed that the replenished electronic money is usable.

Although the replenishment instruction of the electronic money is usually issued by the person retaining the recording medium, someone other than the person may issue the instruction. Further, though the instruction may be directly accepted by the electronic money replenishing means, the electronic money management system side may be provided with replenishment instruction accepting means of accepting the replenishment instruction of the electronic money and the monetary value corresponding to the electronic money, and replenishment instruction management means of transmitting the electronic money of the accepted monetary Value portion to electronic money replenishing means capable of replenishing the electronic money to the recording medium of the replenishment target through the communicating path.

Another electronic money management system of the present invention is a system connected to one or plural electronic money reducing means of reducing the electronic monetary value of the monetary value portion used at predetermined shop by the person retaining the recording medium from a portable recording medium comprised by recording the medium identification information to identify itself, the issuer identification information to identify the issuer of the electronic money, and the electronic money having the monetary value through the communication path, and the system is characterized by comprising: information acquiring means of acquiring medium identification information recorded in the recording medium, issuer identification information, shop identification information to identify an utilized shop, and reduction information on the electronic money from any of the electronic money reducing means through the communication path; and settlement management means of specifying an issuer based on the issuer identification information from among pieces of the information acquired by this information acquiring means, specifying the utilized shop based on the shop identification information, specifying the monetary value based on the reduction information on the electronic money, and at the same time, totalizing the monetary value for each specified issuer and shop, and performing the delivery of the totalized monetary value between the issuer and shop.

The reduction information on electronic money is referred to as information for specifying a fact of reduction and its monetary value. By the electronic money management system having such a constitution, even if the electronic money is different for each issuer, it can be reduced from arbitrary electronic money reducing means, and moreover, it can be guaranteed that the monetary value by the reduced electronic money are delivered to the shop.

Another electronic money management system of the present invention is characterized by comprising:

first information acquiring means of acquiring medium identification information on the recording medium of the replenishment target, issuer identification information and replenishment information on the electronic money through the electronic money replenishing means of replenishing the electronic monetary value of the monetary value portion instructed for a portable recording medium comprised by recording medium identification information to identify itself and issuer identification information to identify the issuer of the electronic money;

second information acquiring means of acquiring the medium identification information, issuer identification information, shop identification information to identify the utilized shop, and reduction information on the electronic money recorded in the recording medium through electronic money reducing means of reducing the electronic money of the monetary value portion utilized at the predetermined shop by the person retaining the recording medium from the recording medium recorded with the electronic money having the monetary value;

deposit money management means of specifying an issuer based on the issuer identification information from among pieces of the information acquired by the first information acquiring means, and specifying monetary value corresponding to the electronic money to be replenished based on the replenishment information on the electronic money, and at the same time, totalizing this monetary value for each specified issuer, and performing the delivery of the totalized monetary value to the issuer, and settlement management, means of specifying an issuer based on the issuer identification information from among pieces of the information acquired by the second information acquiring means, specifying the utilized shop based on the shop identification information, specifying the monetary value based on the reduction information on the electronic money, and at the same time, totalizing the monetary value for each specified issuer and shop, and performing the delivery of the totalized monetary value between the issuer and shop.

By the electronic money management system having such a constitution, even if the electronic, money is different for each issuer, it can be replenished in arbitrary recording medium, and can be reduced from arbitrary electronic money reducing means. Moreover, the replenished electronic money can be utilized, and it can be guaranteed that the monetary value by the reduced electronic money is delivered to the shop.

Note that, in such electronic money management system, at least either one of the deposit money management means and the settlement management means may be constituted such that the delivery of the monetary value is performed by the control of the circulation of the monetary value, for example, by inter-account transactions of the predetermined financial institution. Further, the replenishment instruction accepting means and replenishment instruction management means may be additionally provided.

The replenishment instruction of the electronic money is issued through a communication terminal, which is connected with a medium reader/writer performing the delivery of the information with the recording medium of the replenishing target and performs communications through the predetermined communication path, and the electronic money replenishing means may be constituted such that the replenishment of the electronic money into the recording medium, the medium identification information from the recording medium, and the reading of the issuer identification information are performed through the medium reader/writer, and at the same time, the replenishment information on the electronic money, the recording medium identification information and the issuer identification information are outputtable through the communication path.

Alternatively, the replenishment instruction of the electronic money may be performed through a first communication terminal to perform communications through the predetermined communication path, and the electronic money replenishing means may be constituted such that the replenishment of the electronic money into the recording medium, the medium identification information from the recording medium, and the reading of the issuer identification information are performed through a second communication terminal, which is connected with the medium reader/writer to perform the delivery of the information with the recording medium and performs communications through the communication path, and at the same time, the replenishment information on the electronic money, the recording medium identification information and the issuer identification information are outputtable through the communication path. That is, the communication terminal to issue the replenishment instruction and the medium reader/writer to actually replenish the electronic money may be different.

Further, the utilization of the electronic money is performed through the communication terminal, which is connected with the medium reader/writer to perform the delivery of the information with the recording medium recorded with the electronic money and performs communications through the predetermined communications path, and the electronic money reducing means may be constituted such that the reduction of the electronic money from the recording medium, the medium identification information from the recording medium, and the reading of the issuer identification information are performed through the medium reader/writer, and at the same time, the reduction information on the electronic money, the shop identification information, the medium identification information and the issuer identification information are outputtable through the communication path.

The electronic money replenishing means is attached to the settlement register of the shop, and a change arisen in the settlement register may be converted into the electronic money so as to be replenished in the recording medium. If performing in this manner, the advantage of the electronic money capable of handling low monetary value is made good use of, and the electronic money can be put into use more widely than ever.

When the recording medium is replenished with the electronic money, it often remains to be seen whether the replenishment (recording) has been always stopped in an orderly manner. In case the electronic money is replenished through the communication path, particularly such tendency can be observed. Hence, with respect to the recording medium in which the replenishment is not normally completed, there is provided recovery management means to perform a recovery processing, that is, a processing to repair the recording medium to a state in which the replenishment is normally completed.

History management means may be provided, which records and allows the replenishment history of the electronic money to the recording medium and the utilization history of the electronic money from the recording medium to be linked with the medium identification information, thereby enabling the electronic money management system to grasp the utilization status of the recording medium.

The replenishment instruction of the electronic money from a third party other than the person retaining the recording medium of the replenishing target is accepted by the replenishment instruction accepting means, and the monetary value corresponding to the electronic money of the replenishing target in the replenishment instruction management means is retained together with the name of the third party and the medium identification information on the specific recording medium, and at the same time, the retained electronic money may be replenished in the recording medium when the electronic money replenishing means replenishable to the specific recording medium is specified. The third party in this case is taken as an issuer, and the replenishment instruction of the electronic money equivalent to the predetermined monetary value issued by the issuer to the recording medium matching the condition set independently by the issuer may be issued. In case the replenishment instruction of the electronic money from the third party is accepted, message management means of transmitting a predetermined message to the person retaining the specific recording medium is further provided.

The electronic money management method of the present invention is characterized by reading a predetermined computer program by a computer and executing in the computer:

a first information acquiring processing for acquiring the medium identification information on the recording medium of the replenishing target, the issuer identification information, and the replenishment information on the electronic money through the electronic money replenishing means of replenishing the electronic monetary value for the monetary value portion instructed in the portable recording medium comprised by recording the medium identification information to identify itself and the issuer identification information to identify the issuer of the electronic money;

a second information acquiring processing for acquiring the medium identification information, the issuer identification information, the shop identification information to identify utilized shops, and the reduction information on the electronic money recorded in the recording medium through the electronic money reducing means for reducing the electronic money for the monetary value portion utilized at the predetermined shop by the person retaining the recording medium from the recorded medium recorded with the electronic money having the monetary value;

deposit money management processing for specifying the issuer based on the issuer identification information from among pieces of the acquired information, specifying the monetary value corresponding to the electronic money to be replenished based on the information on the electronic money, and at the same time, totalizing this monetary value for each specified issuer, and performing the delivery of the totalized monetary value to the issuer; and settlement management processing for specifying the issuer based on the issuer identification information from among pieces of the acquired information, specifying the utilized shops based on the shop identification information, specifying the monetary value based on the information on the electronic money, and at the same time, totalizing this monetary value for each specified issuer and shop, and performing the delivery of the totalized monetary value between the issuer and shop, wherein the environment is constructed such that the electronic money managed independently by each of plural issuers is made replenishable in arbitrary electronic money replenishing means, and at the same time, made reduceable in arbitrary electronic money means.

The computer program of the present invention is a computer program for allowing each processing to be executed by the computer in the above described electronic money management method, and is materialized by being recorded on the recording medium readable by the computer.

BEST MODE FOR CARRYING OUT THE INVENTION

Preferred embodiments of the present invention will be described below in detail with reference to FIGS. 1 to 18.

[General Structure]

Figure 1:
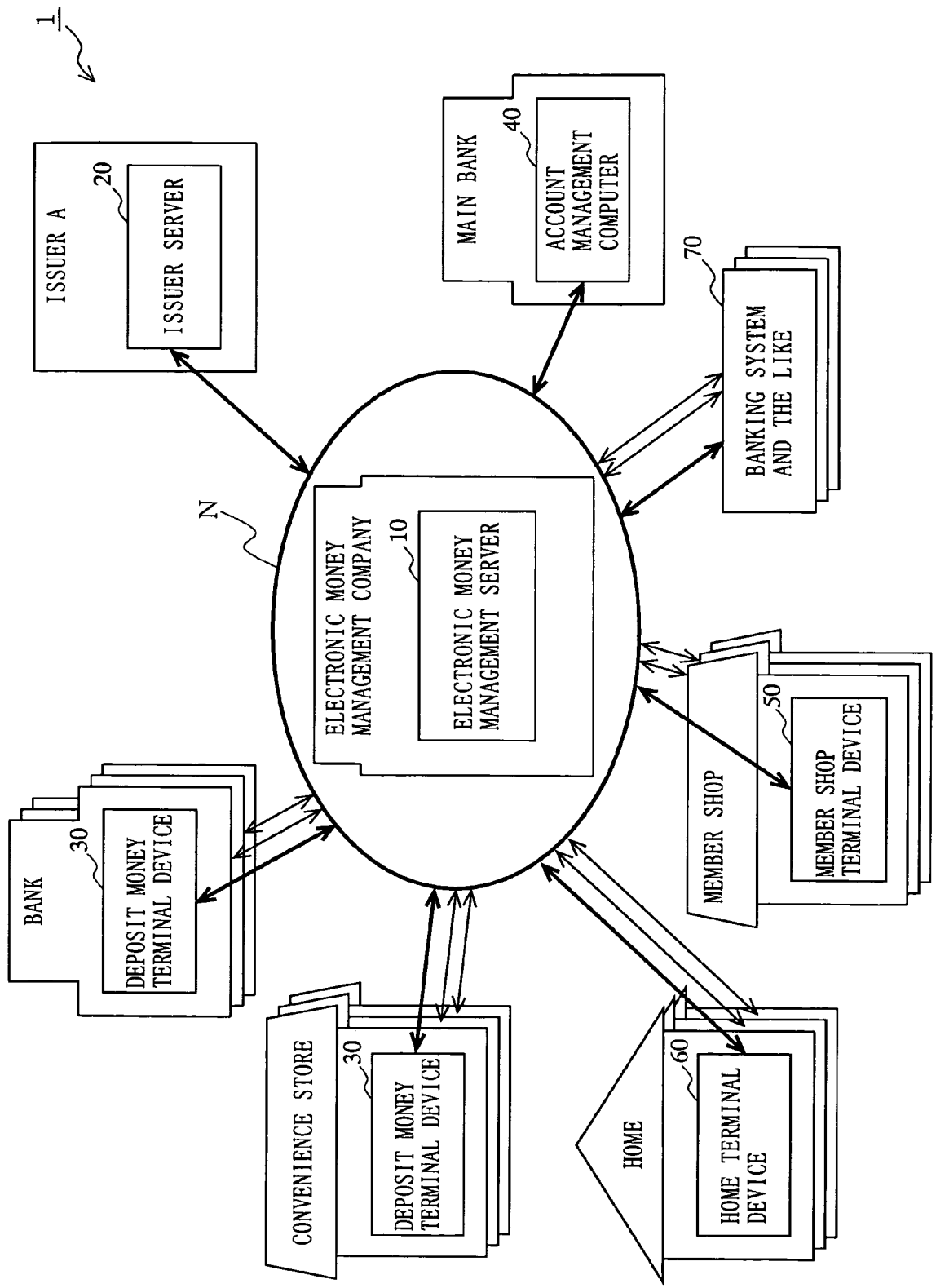
FIG. 1 is a general block diagram of an electronic money system according to one embodiment of the present invention.

FIG. 1 is a general block diagram of an electronic money system adapted to the present invention.

Although the electronic money system can be realized by a local computer network using a LAN (Local Area Network), an in-house computer network using a private line or a pseudo private line, a global network and the like using a wide area computer network such as an internet and the like, the present embodiment will describe an example of the electronic money system by the global network.

The electronic money system 1 of the present embodiment disposes an electronic money management server 10 which becomes an example of the electronic money management system 1 on an internet N, and by this electronic money management server 10, all information, processings concerning the electronic money including a deposit money management processing, a settlement management processing, an information enquiring processing and the circulation of the monetary value corresponding to these processings are performed.

The electronic money server 10 is provided with an incidental management mechanism based on the result information on this information processing, and for example, also a mechanism to perform cash collection, settlement, distribution, totalization, and the like, which is a representative example of the monetary value.

The internet N is connected or connectable with an issuer server 20 disposed in the issuer of the electronic money, a deposit money terminal device 30 which becomes an example of electronic money replenishing means, an account management computer 40 of a main bank, a member shop terminal device 50 which becomes an example of electronic money reducing means, a home terminal device 60 for individual user, and various computer systems 70 (hereinafter referred to as [banks system and the like]) such as a credit system carried by a credit card company issuing credit cards and plural inter-bank dealings concluded by the banks issuing cash cards.

Note that, when referred to as the home terminal device, it includes a portable terminal such as information processing terminal used for individual use in business institutions, PDA, and the like The deposit money terminal device 30, the member shop terminal device 50, and the home terminal device 60 are installed respectively at plural places as the need arises, and can be appropriately increased and decreased.

The issuer server 20 is installed at each of plural issuers, and manages the information concerning the amount of issue of the electronic money issued by the issuer and other electronic money.

However, if the payment of cash for the issuance of the electronic money can be managed, the present invention can be executed. Hence, the mode of management regarding the electronic money may be optional.

Each issuer issues, in addition to the electronic money, a recording medium to record the electronic money, for example, an user card which becomes an example of the portable recording medium mounted with an IC chip.

The user card, as a principle, is issued one sheet from one issuer. However, when executing the present invention, there is no need for all the issuers to issue their independent user cards, respectively, and the user card may be any one card issued by any issuer. The user card functions only, as an electronic moneybag to record the electronic money, and may be recorded with an issuer ID to identify the issuer of the electronic money when making dealings by using the electronic money. Hence, one sheet of the user card will suffice.

The deposit money terminal device 30 is a device to replenish the electronic money in the user card based on the replenishment instruction from the user and the like, and is installed at various places such as a bank, a convenience store, a credit card company, a deposit money dealer of the member store, and the like. ATM at the bank and the credit company, MMK (multifunctional information terminal machine: multimedia corresponding multifunctional information terminal conjugated with ATM function, EC (electronic commerce), public utility charge receiving mechanism, and the like) at the convenience store, and the settlement register with a deposit money function at the member store can be turned into the deposit money terminal device 30.

The deposit money terminal device 30 performs the replenishment of the electronic money for the monetary value portion by any of the instructions from the input in cash, credit card settlement, the electronic money management server 10. In case the deposit money terminal device 30 is installed by the specific issuer, when replenishing, the issuer ID is recorded on the user card. In case the deposit money terminal device 30 can select the issuer, the issuer ID of, the selected issuer is recorded on the user card.

When replenishing the electronic money, the replenishment information on the card ID, the issuer ID, and the electronic money is transmitted to the electronic money management server 10 from the user card of the replenishing target. The information on the electronic money is the electronic money management information on the monetary value (amount of money in the case of cash) and the like corresponding to the electronic money and others.

In case the electronic money is replenished by the input, in cash, the deposit money terminal device 30 comprises a mechanism to transmit the recovered cash to the management main body (referred to as [electronic money management company]) of the electronic money management server 10.

The account management computer 40 of the main bank is a computer to manage a registered account of the main bank of the electronic money management company. The main bank is a bank having an account to receive the cash accompanied with issuance and utilization of the electronic money and settle the payment. This account management computer 40 of the main bank is connected to the electronic money management server 10, and as the need arises, performs the processing for the inter-account dealings among the issuer, the shop and the like.

The member shop terminal device 50 is a device for receiving the payment of the user by the electronic money, and is installed at the shop (this is referred to as [member shop]) which can handle the electronic money. The member shop is a shop which provides commodities, various pieces of information, sales of digital contents, and services.

The member shops are divided into real shops, so-called cyber shops on the internet, and shops having both of the shops. In the real shops, there are shops installed with a shop terminal mounted with a card certification module, POS, and an automatic vending machine (terminal itself performs exchanges with the card while maintaining security), and shops installed with a terminal not mounted with a card certification module, and shops installed with MMK and the like (terminal has a function only to relay secured exchanges between the center and the user card) which perform the processing by on-line with the electronic money management server 10.

Among the cyber member shops, there are shops having a site (terminal has a function only to relay secured exchanges between the center and the user card) which simultaneously completes the payment by the electronic money in the purchase of the digital contents and commodities on the internet, and shops which perform, advance booking for tickets and box lunches by using the internet and pay (terminal itself performs the exchanges with the card while keeping security) the value by POS registers installed at the shops such as convenience stores and the like. In the present embodiment, in any type of member shops, the payment by the electronic money is made possible.

The home terminal device 60 is, for example, a personal computer (abbreviated as PC) comprising a two-way communication facility through the computer network, and is connected to an IC card reader/writer, and by using this IC card reader/writer, replenishes the user card with the electronic money, and can use the electronic money recorded in the user card.

[User Card]

Here, the user card used in the electronic money system 1 of the present embodiment will be described. For the user card, either of a contact type IC card for performing the supply of electric power and input and output of signals by electric contact (contact) or a non-contact type IC card having no external terminal can be used. As an example of the non-contact type IC card, the [Felica] (Registered Trade Mark) manufactured and supplied by Sony Corporation or the like can be used.

Figure 2:
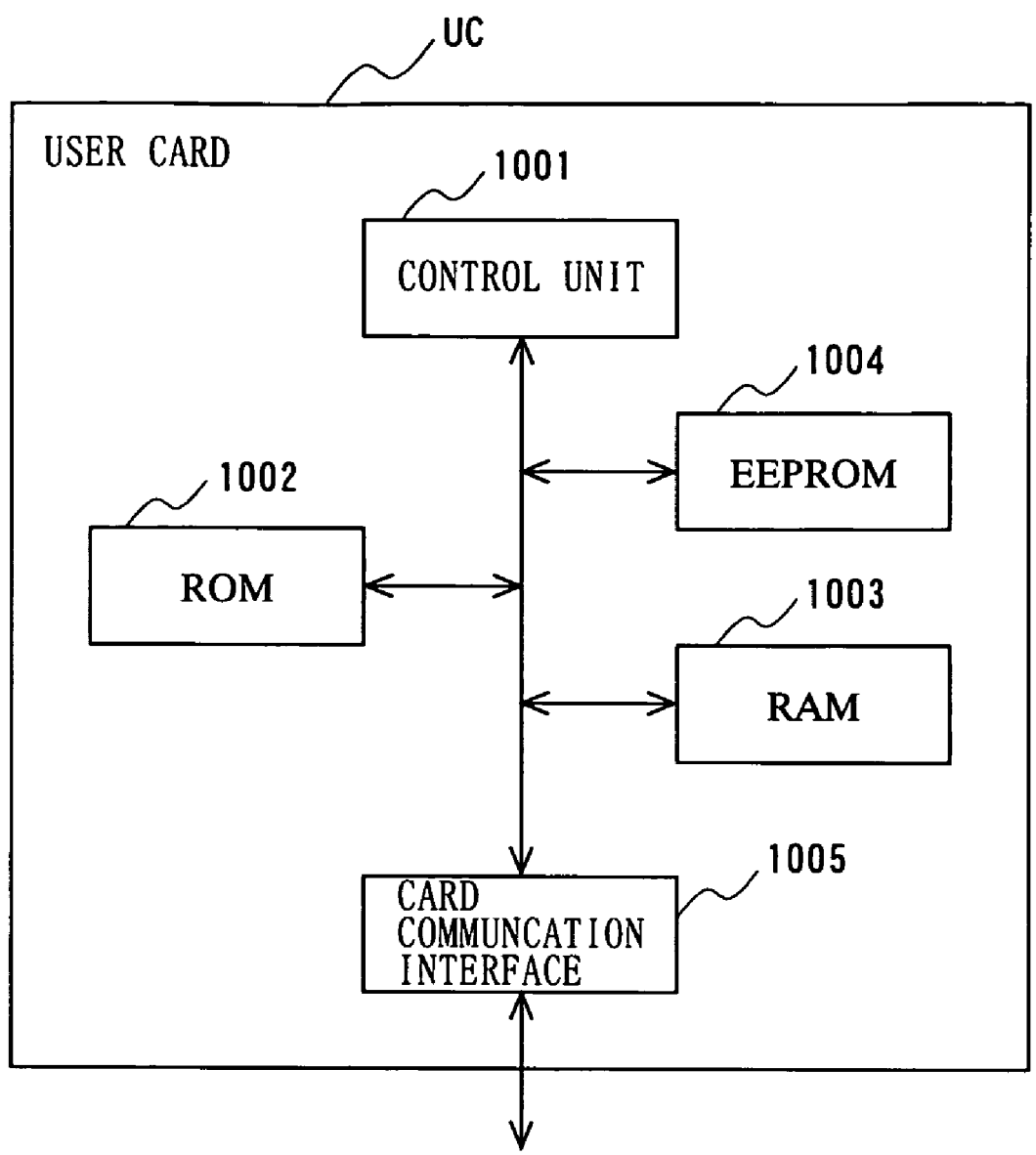
FIG. 2 is a block diagram of a user card which becomes an example of a recording medium.

FIG. 2 is a view showing an example of the user card.

This user card UC comprises a control unit 1001 constituted by a CPU (Central Processing Unit) formed within an IC chip, a ROM (Read Only Memory) 1002, RAM (Random Access Memory) 1003, an EEPROM (Electrically Erasable and Programmable Read Only Memory) 1004, and a card communication interface 1005 formed on a card medium.

The card communication interface 1005 becomes an electric contact in the case of the contact type IC card, and becomes a transmitting and receiving antenna in the case of a non-contact type IC card.

Figure 3:
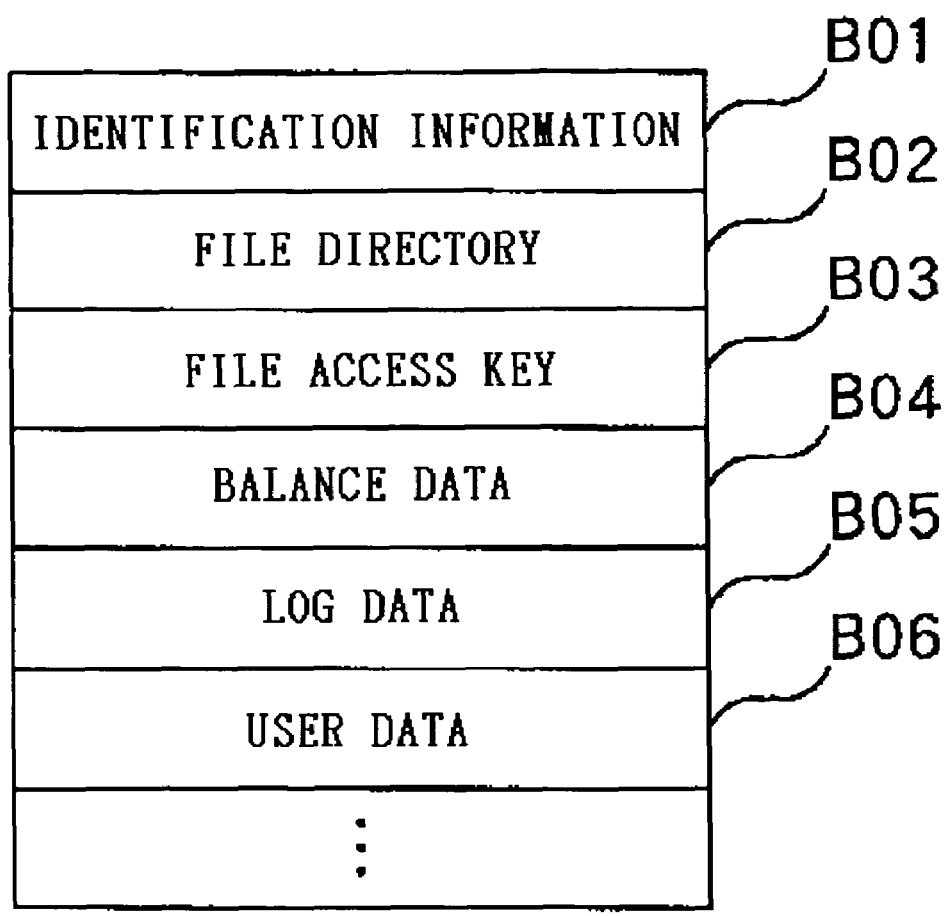
FIG. 3 is a view showing an example of information recorded in an EEPROM of the user card.

The EEPROM 1004, as shown in FIG. 3, is recorded with management information such as identification information B01, definition information B02 on files and directories, management information such as an access key B03 to files and the like, and a balance data B04 representing the balance of electronic money, a log data B05 representing the utilization history (including the history concerning the recovery) of the electronic money, a user data B06 concerning the user, and the like.

Figure 4:
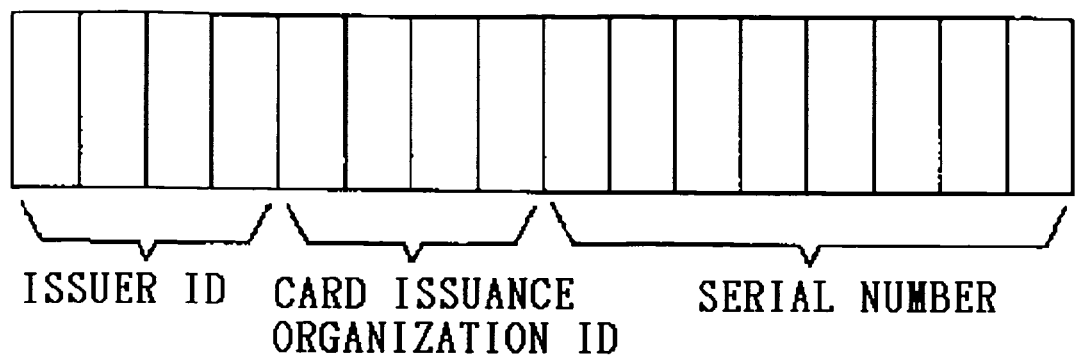
FIG. 4 is a structural explanatory view of identification information.

The identification information B01, as shown in FIG. 4, comprises numerals of 16 digits and the fist four digits become an issuer ID to identify the issuer of the electronic money, the next four digits become a card issuance organization ID to identify the organization having issued the card, and the next eight digits become a serial number unique for the IC card.

The combination of the card issuance organization ID and the serial number is treated as a card ID.

Next, the structural examples of respective terminal devices 20 to 60 and the electronic money management server 10 will be described more in particular.

(Deposit Money Terminal Device)

Figure 5:
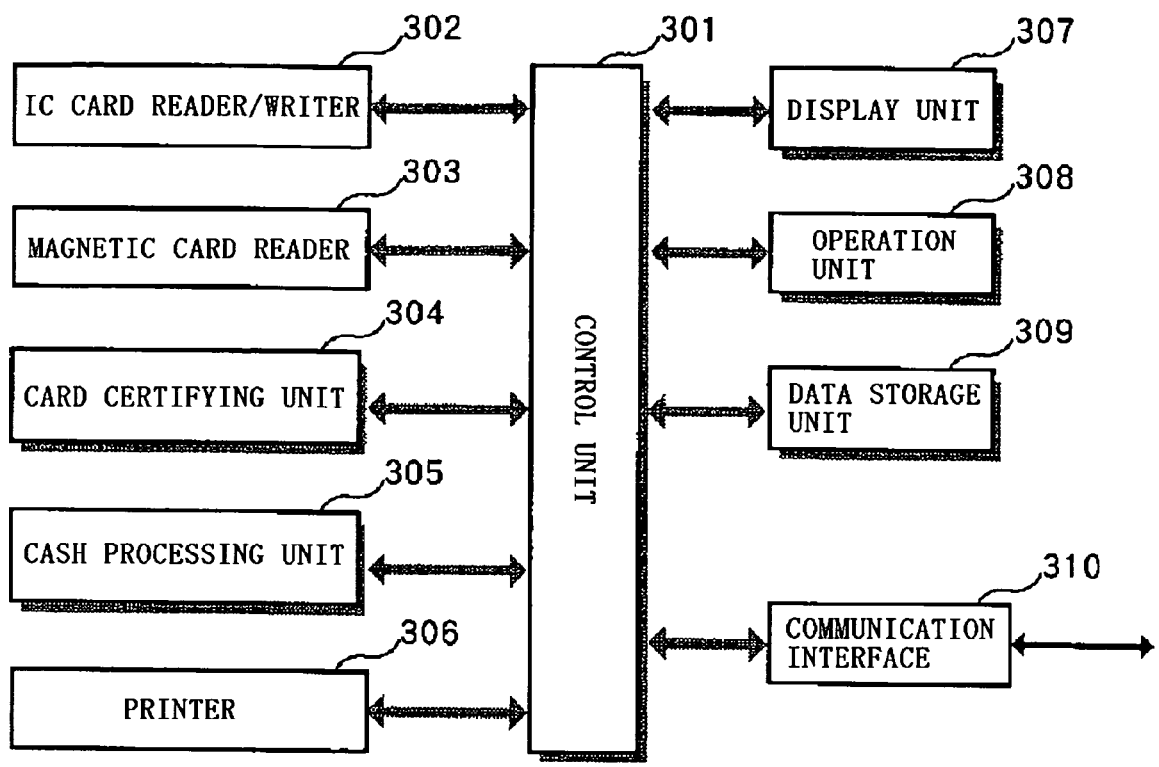
FIG. 5 is a functional block diagram of a deposit money terminal device.

The deposit money terminal device 30, as the structural example shown in FIG. 5, comprises a control unit 301, an IC card reader/writer 302 to perform the delivery of the data with an user card UC retained by the user, a magnetic card reader 303 to read the data from a magnetic recording zone (stripe) of the cash card and the credit card of the user, a card certification unit 304 to certify the authenticity of the user card, cash processing unit 305 to perform the determination of the type of cash inputted, its acceptance, and other required processings, a printer 306 to print a receipt which is a replenishing record, a display unit 307 comprising liquid crystal or CRT, an operation unit 308 comprising a key board or a touch panel, a data storage unit 309 to store information concerning the replenishment of the electronic money, and a communication interface 310 to perform communications with an external device through the computer network.

The control unit 301, taking the operation of the operation unit 308 by the user, the mounting of the IC card reader/writer 302 on the user card UC or the mounting of the card on the magnetic card reading 303 as an opportunity, controls all the operations concerning the reading of the information from the user card UC and the replenishment of the electronic money to the user card UC. As the need arises the communication path is established with the electronic money management server 10, and the delivery of the required information is performed.

The data storage unit 309, in addition to the information concerning the replenishment of the electronic money, is recorded with the ID to identify the deposit money terminal device 30, for example, as the number of numeral ten digits. This ID is a unique number for the deposit money terminal device 30, and is used for the purpose of managing the distributing state of the electronic money by the electronic money management server 10 and the like.

[Electronic Money Management Server]

The electronic money management server 10 is realized by a server main body having a function to perform communications through the internet N and a computer program of the present invention read by the CPU of this server main body so as to allow various functions concerning the electronic money management to be formed within the server main body.

Figure 6:
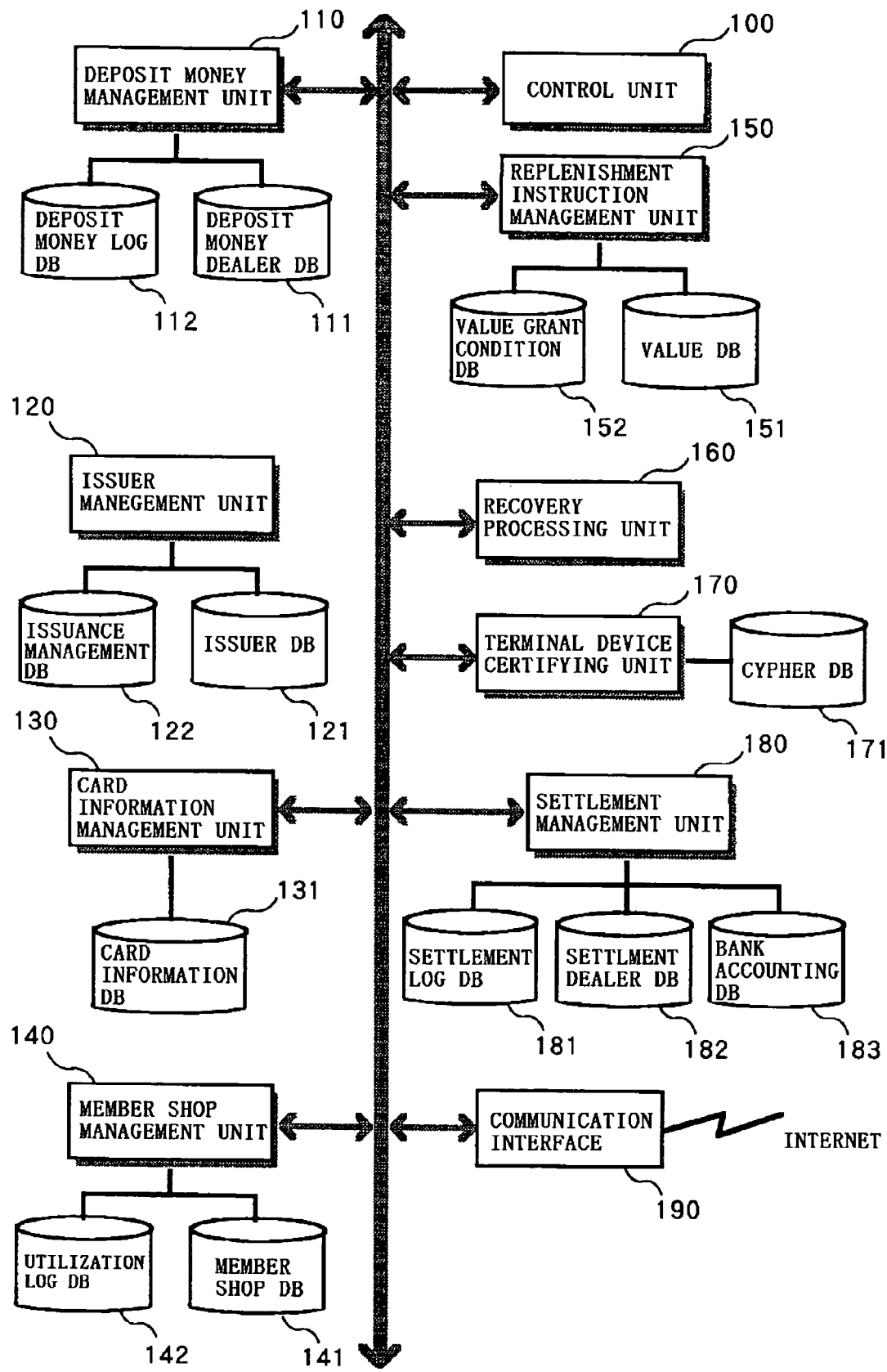
FIG. 6 is a functional block diagram of an electronic money management server.

FIG. 6 is a block diagram of a functional block formed by reading and realizing the computer program by the server main body.

In the present embodiment, a control unit 100 to perform a collective control concerning the electronic money management, a deposit money management unit 110 to perform a deposit money management when replenishing the electronic money, an issuer management unit 120 to manage the information on all issuers issuing the electronic money, a card information management unit 130 to manage the information recorded in the user card UC, a member shop management unit 140 to manage the information on all member shops capable of using the electronic money, a replenishment instruction management unit 150 to manage the information on the replenishment instruction of the electronic money accepted from the outside, a recovery processing unit 160 to normally repair the user card UC in which the replenishment of the electronic money is not normally completed to a state in which the replenishment is normally completed, a terminal device certifying unit 170 to perform the certification of various types of the terminal devices, a settlement management unit 180 to perform a settlement processing when the electronic money is utilized (settled), and a communication interface 190 to control communications performed with the internet N.

The deposit money management unit 110 performs a processing concerning the deposit money management when the electronic money is replenished, and also has a function to generate a web screen when accepting the replenishment instruction from the user and the third party. Further the deposit money management unit 110 has a deposit money dealer database (hereinafter, the database is abbreviated as [DB]) 111 storing the information on the dealer concerning the deposit money, and a deposit money log DB 112 to record the history of the deposit money paid for replenishment linked with the information to identify the user card UC. The utilization log is retrospectively used to grasp the utilization status of the user card UC.

The issuer management unit 120 has the issuer DB 121 to accumulate the information on the registered issuers and an electronic money issuance management DB 122 to register a total data of the utilized electronic money and the value corresponding thereto for each issuer.

The card information management unit 130 has a card information DB 131 to accumulate the information on the user card UC in which the electronic money is replenished or reduced.

The member shop management unit 140 has a member shop DB 141 to accumulate the information on all shops affiliated with the electronic money system 1 and an utilization log DB 142 to accumulate the fact that the electronic money has been utilized and the like.

The replenishment instruction management unit 150 has a value DB 151 to temporarily retain the electronic money instructed to replenish a specific user card UC from the third party together with the information in which the name of the third party and the user card UC of a replenishing target are known, and for example, a value grant condition DB 152 accumulating the condition and the like to grant the electronic money independently set by the issuer.

The terminal device certifying unit 170 has a cryptograph DB 171 to accumulate a key to be used when cryptograph communications are performed.

The settlement management unit 180 has a settlement log DB 181 to accumulate the date and hour, the amount, the shop and the like where the electronic money has been utilized for the user card UC and each issuer, a settlement dealer DB 182 to accumulate the information on the businessman involved in the settlement of cash and the like, and a bank account DB 183 to accumulate the bank account and the like of the person (businessmen, shop operator, and the like) who becomes a deposit money target or a debit target.

The settlement log is used to grasp and analyze the utilizing status of the user card UC or the like ex-post facta.

[Issuer Server]

The issuer server 20 is also realized by a server main body having a communication function through the internet N and a computer program read by the CPU of this server main body so as to allow the required function to be formed within the server.

Depending on the issuer, a case is conceivable in which a service is performed to pay to an original user a point having the cash of the utilized amount or the financial value identical to that amount at a point of time when the issuer recognizes that the electronic money issued by itself is utilized, and in such a case, though the most, simplest management mode to manage the cumulative total of the utilized electronic money is possible, in the present embodiment, in order to be able to grasp the circulation status of the electronic money and the utilization history thereof also, an example is cited where a money account corresponding to the user card UC issued by itself one for one is managed together with the cumulative total of the issue amount of the electronic money. The money account is intended to grasp how much the electronic money is recorded in the user card UC at present or how much the electronic money is utilized.

Figure 7:
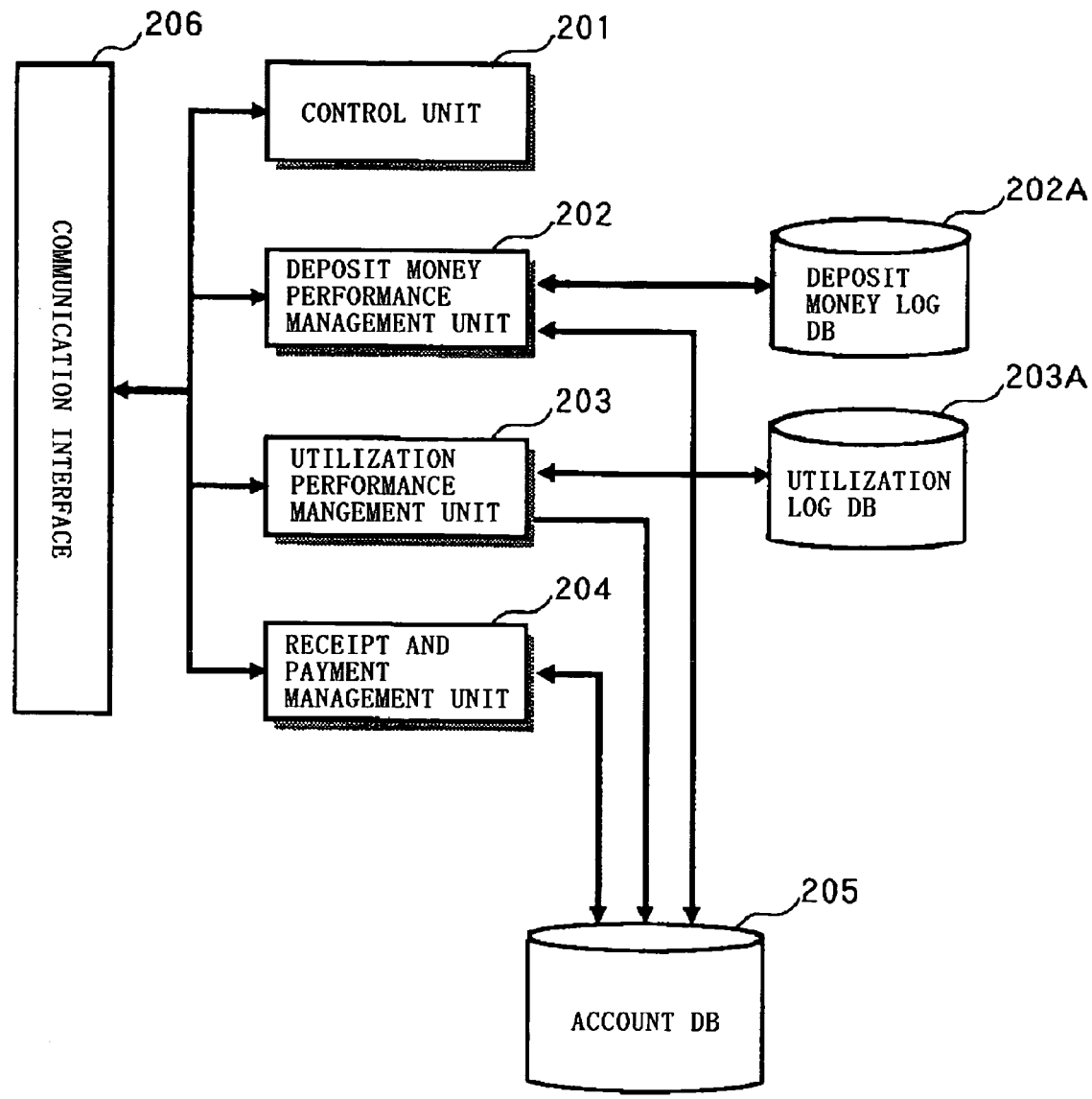
FIG. 7 is a functional block diagram of an issuer server.

Hence, in the present embodiment, as shown in FIG. 7, the issuer server 20 is allowed to be formed with a control unit 201 to collectively perform a control concerning the management of the electronic money, a deposit money log DB202A to perform the management of the deposit money performance concerning the electronic money issued, an utilization log DB203A to accumulate the utilized log of the electronic money, an account DB205 having accumulated the information to specify a money account to record the utilization status of the electronic money for each user card UC, a deposit money performance management unit 202 to manage the utilization performance of the electronic money by corroboration of the deposit money long DB202A and the account DB205, an utilization performance management unit 203 to manage the utilization performance of the electronic money issued by itself by the corroboration of the utilization log DB203A and the account DB205, a receipt and payment management unit 204 to perform a receipt and payment status management of cash corresponding to the issued electronic money and the utilized electronic money by corroboration with the account DB205, and a functional block of a communication interface 206 to control communications with the internet N.

[Member Shop Terminal-Device]

Figure 8:
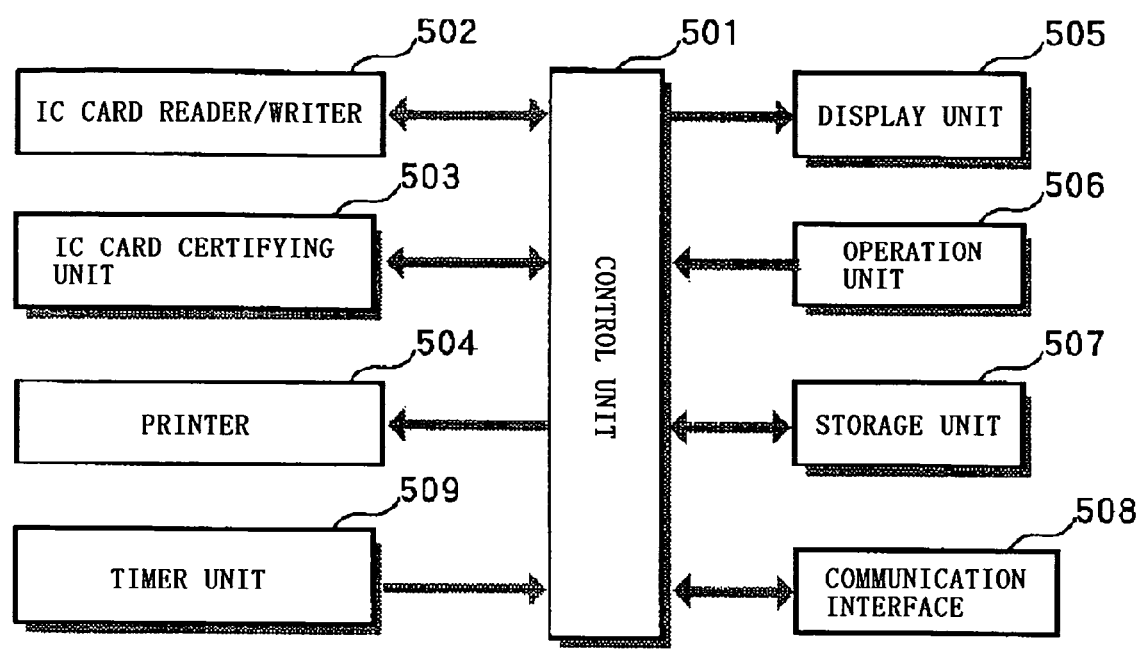
FIG. 8 is a functional block diagram of a member store terminal device.

The member shop terminal device 50, as shown in FIG. 8, comprises a control unit 501 to control the entire system, an IC card reader/writer 502 to perform the delivery of information with the user card UC, an IC card certifying unit 503 to certify the authenticity of the user card UC, a printer 504 to print a receipt which is an using (spending) record, a display unit 505 comprising a liquid crystal or CRT, an operation unit 506 comprising a keyboard or a touch board, a storage unit 507, a communication interface 508 to control communications through the internet N, and a timer unit 509 to time the current time.

The storage unit 507 is recorded with the ID of the member shop terminal device 50, for example, as an identification number of ten digit numerals. This ID is a unique numeral for the member shop terminal device 50, and is used for the purpose of managing a circulation state of the electronic money by the electronic money management server 10 and the like.

[Main Bank Account Management Computer and the Like]

The account management computer 40 and a banking system 70 of the main bank perform the payment to a instructed account or a remittance processing to a instructed account according to the requests of the electronic money management service 10 and the like.

[Home Terminal Device]

Figure 9:
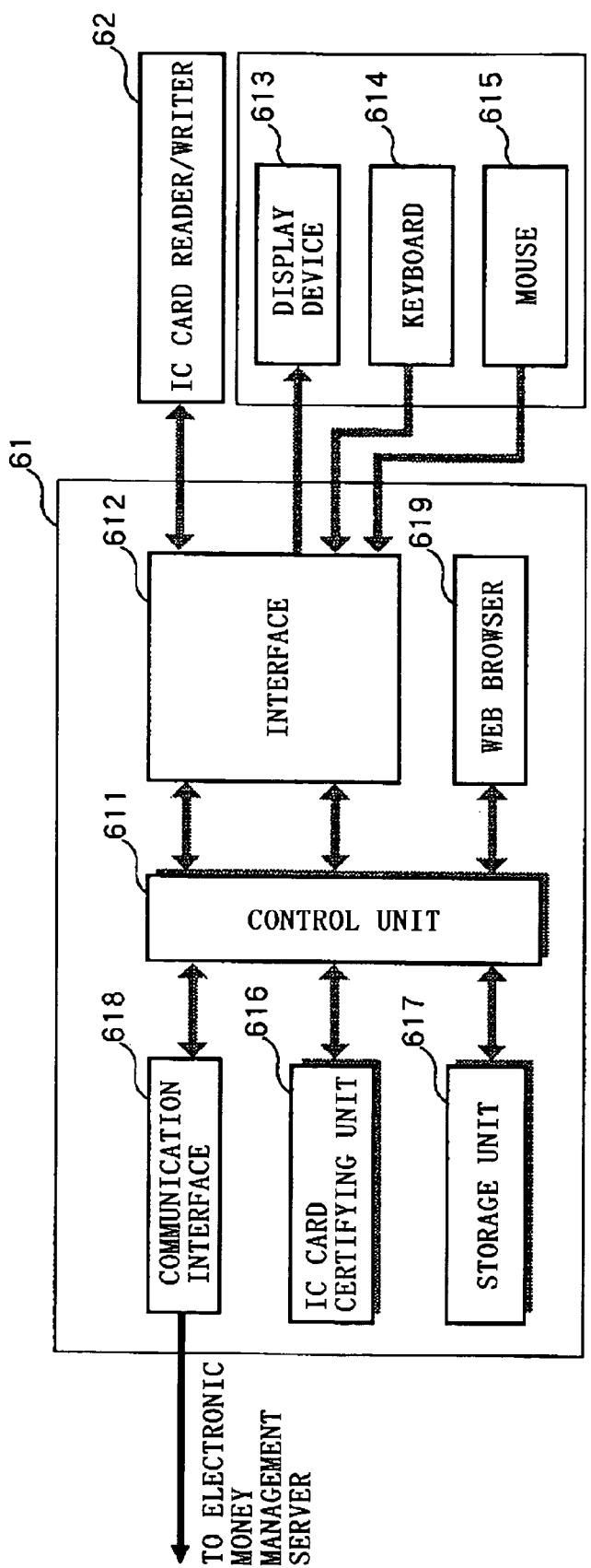
FIG. 9 is a functional block diagram of a home terminal device.

The home terminal device 60, as shown in FIG. 9, is constituted by including a PC 61 and a specified IC card reader/writer 62 connectable to the PC 61. The PC 61, as shown in FIG. 9, is connected with an input device such as a keyboard 614, a mouse 615, and the like, and a display unit 613 such as CRT and a liquid crystal display, and the like. The PC 61 further comprises a control unit 611 to control the operations within the device, an interface 612 with the IC card reader/writer 62, the display unit 613, and the like, an IC card certifying unit 616 to perform a card certification, a storage unit 617 to keep programs and the like stored, a communication interface 618 to be connected to the electronic money management server 10 on the computer network by a subscriber telephone line or an internet private line, and a web browser 619 to display an interface screen on the display device 613.

The IC card certifying unit, 616 may be realized by mounting a specific hardware on the PC 61 or can, be also realized by reading specific program and data supplied from the electronic money management company into the storage unit 617 and executing them by the control unit 611. Further, the web browser 619 is also realized by reading a WWW (World Wide Web) site browser on the market, for example, [Internet Explorer] provided by Microsoft Corporation into the storage unit 617 and executing it by the control unit 611.

<Operation Mode: Electronic Money Management Method>

Next, an example of the operation mode of an electronic money system 1 according to the present embodiment will be described.

Here, a replenishment mode of the electronic money, contents of the deposit money management processing at the replenishment time, the utilization mode of the electronic money, the settlement management processing at the utilization time will be described.

As the replenishment mode of the electronic money to the user card UC, there are modes by the user's intention (the input in cash by the user, cash card or credit card settlement) and the third party's intention other than the user (gift, premium, and the like). Further, as the replenishment mode and the utilization mode of the electronic money, there are modes by on-line and off-line.

[Replenishment 1 of Electronic Money: Off-Line Replenishment]

Figure 10:
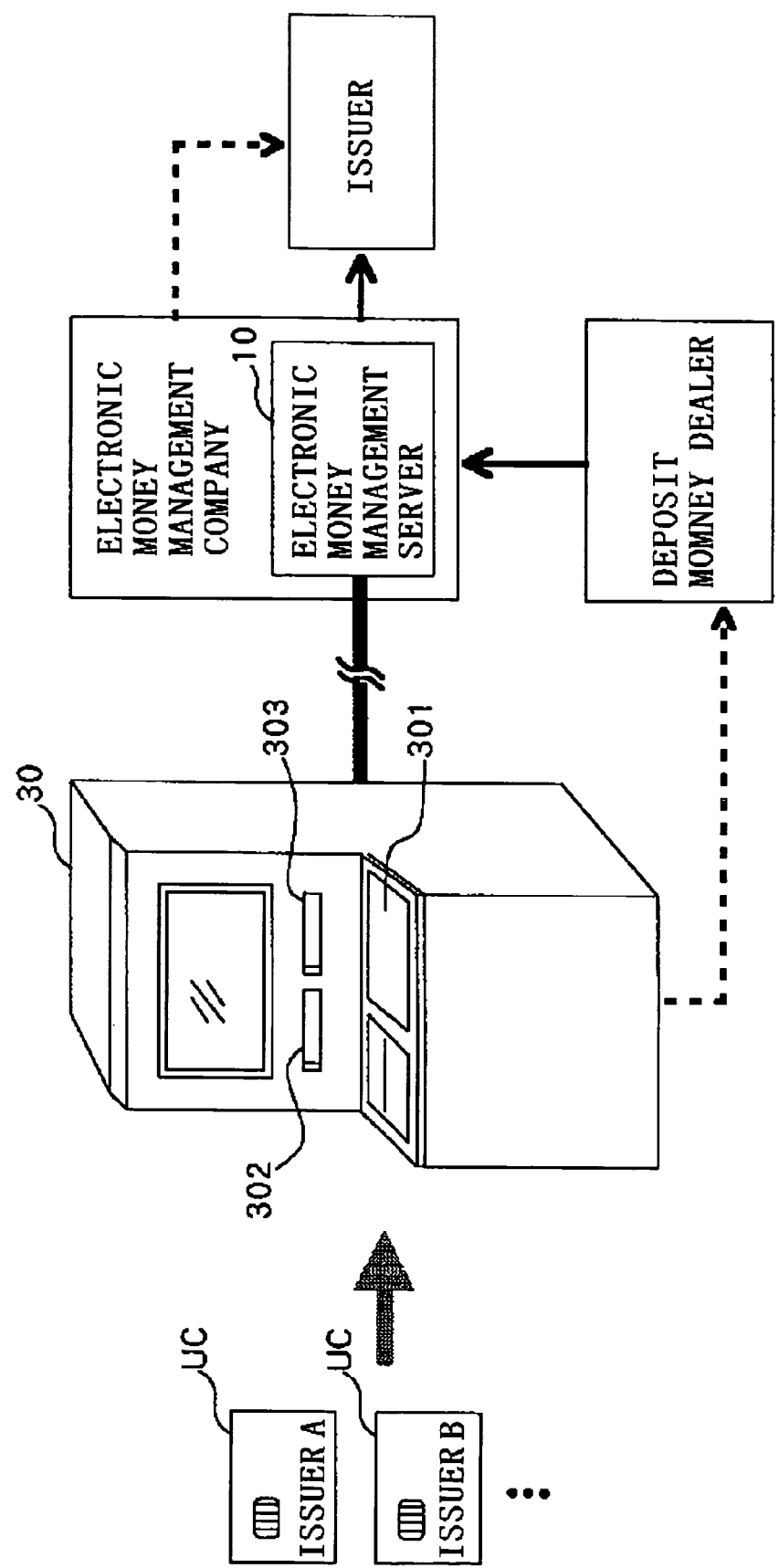
FIG. 10 is a conceptual illustration of a replenishing mode of the electronic money by an off line.

From among the replacement modes of the electronic money by the user's intention, a conceptual view in case of performing the replenishment by the off-line is shown in FIG. 10. The replenishment of the electronic money by the off-line is performed by inputting cash to a cash input port 3010 of the nearest deposit money terminal device 30 by the user having the user card UC or by inserting the cash card or the credit card into a magnetic card reader 303 of the deposit money terminal device 30, thereby replenishing the electronic money of the instructed amount on own user card UC mounted on the IC user reader/writer 302. As the user card UC capable of using the deposit money terminal device 30, it is not limited to the card issued by the issuer who has installed the deposit money terminal device 30, but may be the user card UC issued by other issuers (issuer A, issuer B, . . . ).

Figure 11:
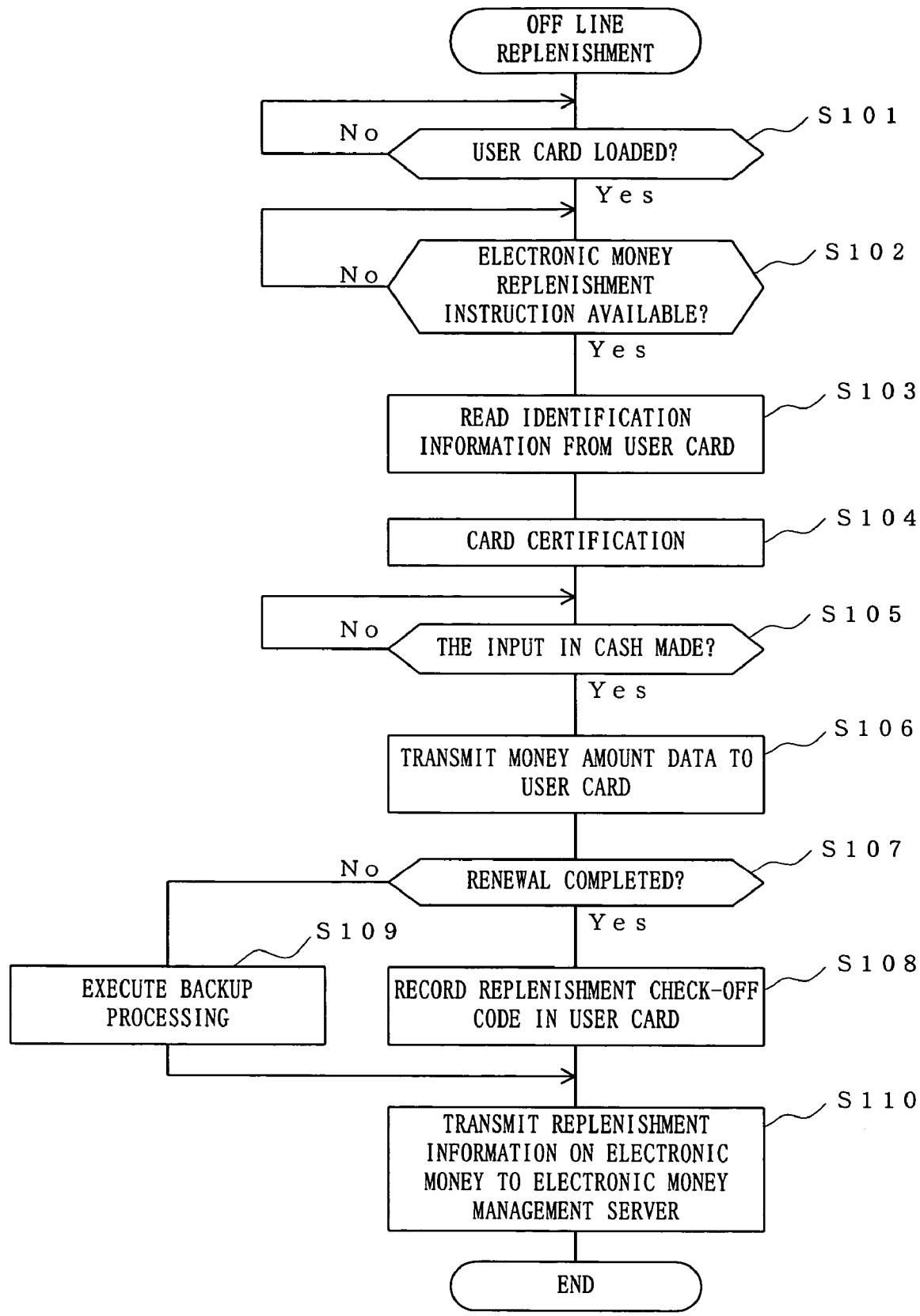
FIG. 11 is a procedure explanatory view of the processing at off-line replenishing time.

The procedure in the deposit money terminal device 30 (control unit 301) in this case is as per FIG. 11.

When the user card UC is loaded into the IC card reader/writer 302 and the replenishment of the electronic money is instructed through the operation unit 308 (step 101:Y and step 102:Y), the control unit 301 reads the identification information B01 recorded in the user card UC through the IC card reader/writer 302 (step 103), and allows the card certifying unit 304 to certify the authenticity of the user card UC (step 104). The card certification may be performed only within the deposit money terminal device 30 or may be performed at the electronic money management server 10 side (card information management unit 130) by being connected to the electronic money management server 10 with the predetermined information transmitted thereto or may be performed by corroboration between the electronic money management server 10 and the deposit money terminal 30.

As a result of the card certification, if the card is an authentic user card UC, the user is urged to input cash through the display unit 307. In case the input in cash is detected (step 105:Y), an amount data representing the money is transmitted to the user card UC (step 106). In the user card UC, the control unit 1001 adds the amount data transmitted from the deposit money terminal 30 to the electronic money balance of the EEPROM 1004, thereby renewing the balance data B04 representing the electronic money balance. In case the renewal is normally completed (step 107:Y), a replenishment check-off code is recorded in the user card UC (step 108). In case the renewal is not normally completed, a backup processing is executed (step 107:N and step 109). The backup processing is a processing in which the deposit money amount represented by the amount data transmitted to the user card UC for replenishment and the identification information B01 of the user card UC are recorded in an unillustrated temporary file. After that the identification number B01 read from the user card UC having normally completed the renewal, the deposit money amount, the date and hour of the deposit money, the deposit money log including the terminal device ID of own device (deposit money terminal device), and the information recorded in the temporary file as the replenishment information of the electronic money are transmitted to the electronic money management server 10 through the communication interface 310 in case the renewal is not normally completed (step 110).

In the processing of step 101, when the user card UC not normally renewed is loaded, a recovery processing thereof is performed. The recovery processing is such that, as described above, though the amount data is transmitted to the user card UC, in case the replenishment check-off data is not recorded in the user card UC due to some troubles, the user card UC is recorded with the replenishment check-off data ex post facta, thereby making the electronic money already recorded utilizable.

Since the user card UC requiring the recovery processing is grasped by the electronic money management server 10 side by the replenishment information, for example, when such user card UC is identified at the card certifying time (step 104 above), the user card UC is recorded with the replenishment check-off data by the instruction from the electronic money management server 10 (recovery processing unit 160).

In the case of the payment by the cash card or the credit card, the bank account number, the credit card number, and the like are read from the magnetic stripes thereof through a magnetic card reader 303, and the card certifying unit 304 is allowed to perform the lending of the credit from the cash card or the credit card. This is different from the processing procedure in the case of the input in cash shown in FIG. 11. The lending of credit is, for example, a processing in which the authenticity of the card and whether or not the amount of the money instructed from the user is within the credit limit are enquired to the banking system 70 and the like. If the card is an authentic cash card or a credit card and moreover, the instructed amount of the money is within the credit limit, the banking system 70 and the like return an approved data to the deposit money terminal device 30. In this manner, the lending of credit is completed.

Although the above is a case where the deposit money terminal device 30 is separately installed at the banks and the like for replenishment of the electronic money, the terminal device 30 linked with the member shop terminal 50 may be installed at the member shop. Further, a settlement register of the shop may be added with the function of the deposit money terminal device 30 as illustrated in FIG. 5, so that the balance generated in the settlement register is converted into the electronic money so as to be replenished in the user card UC.

[Replenishment 2 of Electronic Money: On-Line Replenishment]

Figure 12:
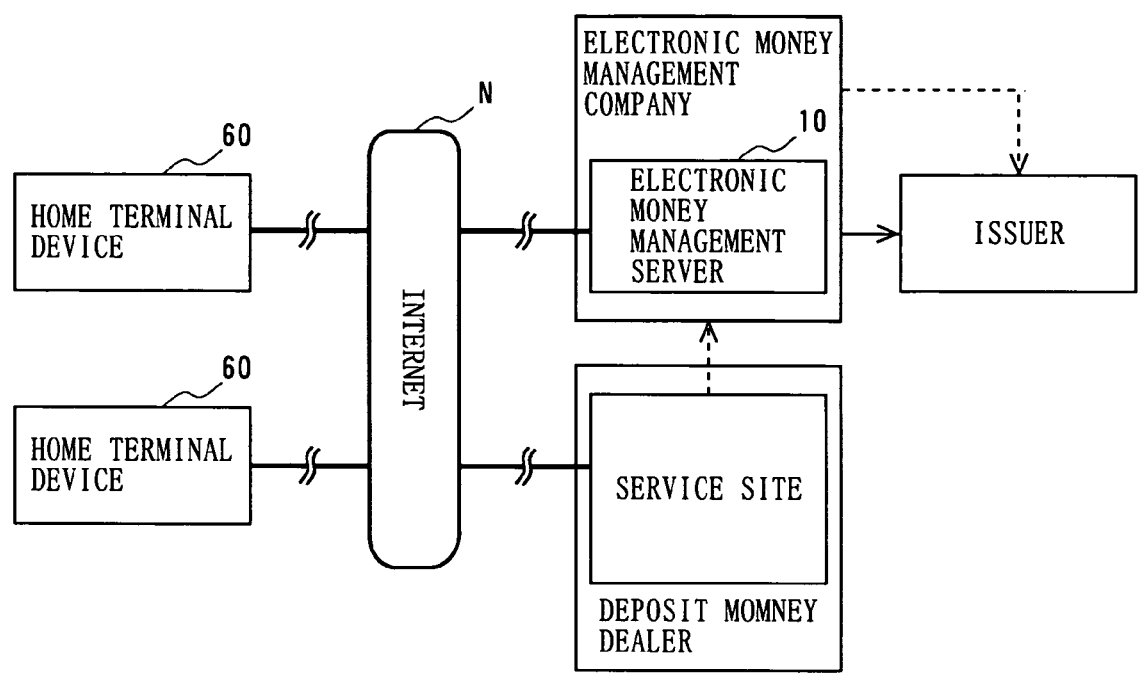
FIG. 12 is a conceptual illustration of the replenishing mode of the electronic money by on-line.

The point of replenishing the electronic money by the on-line by the user will be described. The on-line replenishment is performed by the user by operating the home terminal device 60 as illustrated in FIG. 9. FIG. 12 is a conceptual illustration of the on-line replenishment.

The on-line replenishment has a case of being performed through a service site managed by an electronic deposit money dealer and a case where the electronic money management server 10 allows the user to perform the replenishment. In case the electronic money is replenished through the service site, the cash and the like of the amount instructed to be deposited through the screen provided at the site side is transferred (or remitted) ex-post from the deposit money dealer to the electronic money management company. Except for this transfer, the replenishment is approximately the same as that performed through the electronic money management server 10.

Figure 13:
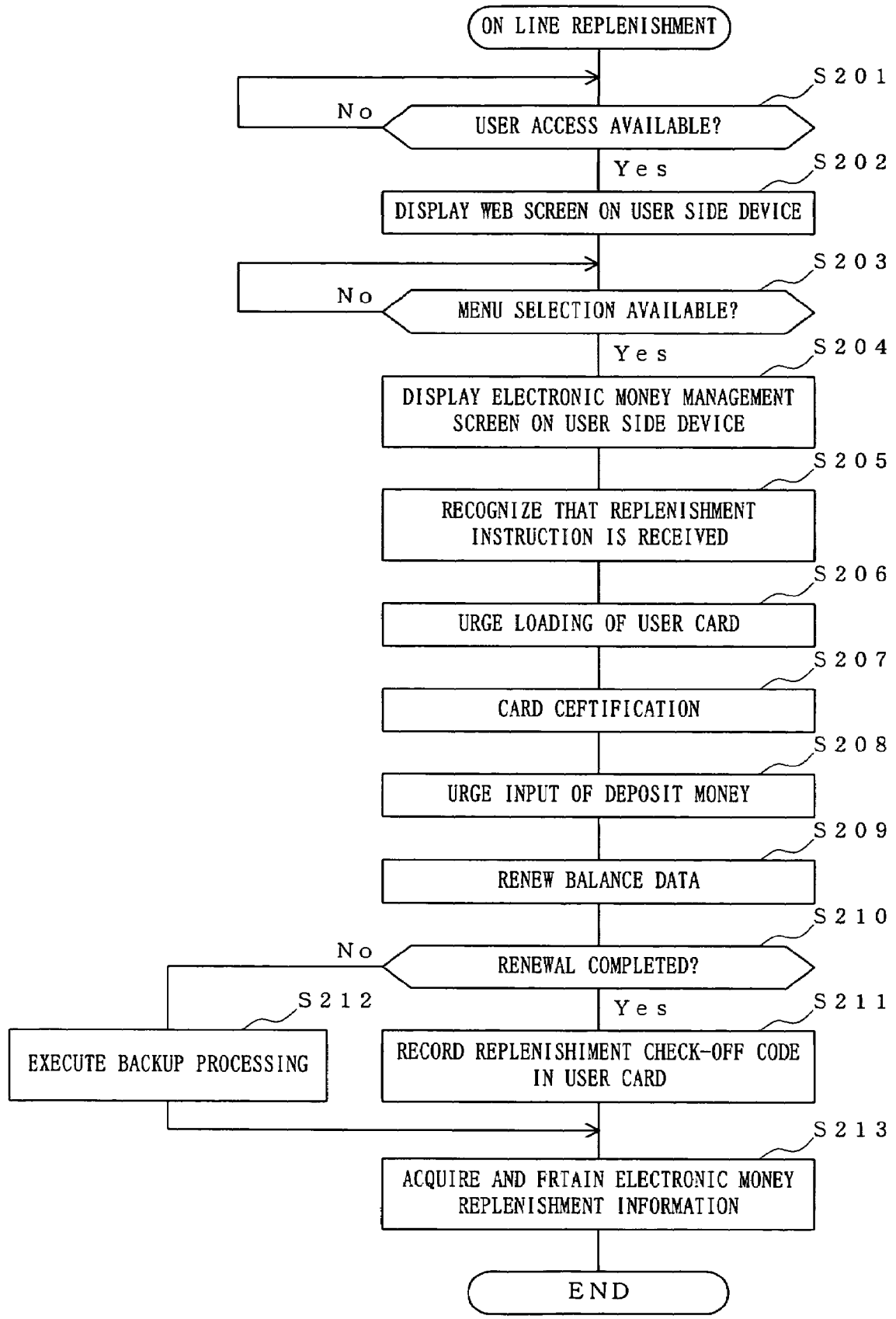
FIG. 13 is a procedure explanatory view of the processing at on-line replenishing time.

The procedure of the on-line replenishment by the electronic money management server 10 is as per FIG. 13. That is, when an access from the user is detected, the electronic money management server 10 allows the display unit 613 ([user side device]) of the home terminal device 60 operated by the user to display a web screen including various menus (step 201:Y and step 202).

When it is detected that the user operates the mouse 615 and selects a menu to deposit the money from the web screen, the electronic money management server 10 transmits an electronic money management screen data of a HTML type, and allows an electronic money management screen to be displayed through the web browser 619 (step 203: Y and step 204). This electronic money management screen is displayed with various service buttons for confirmation of balance, transfer and the like to other users of the electronic money in addition to a deposit money button for replenishment instruction of the electronic money. Here, it is assumed that the deposit money button is selected and the deposit money button is clicked by the user. Then, the data indicating that the replenishment instruction of the electronic money has been issued is transmitted to the electronic money management server 10.

The electronic money management server 10 recognizes this replenishment instruction (step 205) and allows the message to be displayed on the web browser 619 of the home terminal device 60 (PC 61), and urges the user UC to be loaded into the IC card reader/writer 62 (step 206). When the user card UC is loaded, the identification information B01 recorded in the user card UC is read through the IC card reader/writer 62, and the IC card certifying unit 616 is allowed to perform the card certification based on this identification information B01 (step 207). When the card is confirmed to be an authentic user card UC, a guide screen to input the amount of the deposit money in the browser 619 is displayed (step 208). The deposit money is performed by withdrawal from the bank account of the user or by the credit settlement. Hence, the input of the deposit money amount means the input of the bank account number or the credit card number and the input of the withdrawal amount. When it is detected that the user inputs the deposit money amount of the electronic money by the keyboard 614, the amount data indicating that money amount is transmitted to the user card UC through the IC card reader/writer 62, thereby renewing the balance data B04 (step 209). At the user card UC side, the control unit 1001 adds the transmitted money data to the electronic money balance of the EEPROM 1004, thereby renewing the balance data B04 representing the balance of the electronic money.

In case the renewal is normally completed, the user card UC is recorded with a replenishment check-off code (step 210: Y and step 211). In case the renewal is not normally completed, the backup processing is executed (step 210:N and step 212). The backup processing is as described above, and may be executed by the home terminal device 60 or by the electronic money management server 10.

After that, the identification number B01 read from the user card UC having normally completed the renewal, the deposit money amount, the deposit money log including the date of the deposit money, and the information recorded in the temporary file taken as the replenishment information in case the renewal is not normally completed are acquired from the home terminal device 60, and are stored in a value DB151 and the like (Step 213).

[Replenishment 3 of Electronic Money: Replenishment by Instruction from Third Party]

As a mode of replenishing the electronic money in the user card UC retained by the user by the intention of the third party other than the user, there are replenishments by the issuers and by the individuals such as the friends and relatives of the user.

When the replenishment is performed in this case, though it is possible to adopt a mode in which the issuer server 20 or the deposit money terminal device 30 directly accepts the replenishment instruction including the identification information on the person instructing the replenishment and the amount of the money to be replenished, and transmits the deposit money log only including the identification information on the person and the amount of the deposit money to the electronic money management server 10, here, an example is cited in which both the replenishment instruction from the individual and the replenishment instruction from the issuer are accepted through the web screen of the electronic money management server 10 and the replenishment instruction management unit 150.

In the case of replenishment by the issuer, specific replenishment requisite (for example, a grant of the electronic money equivalent to 500 yen and the like for replenishment during the campaign period) and replenishment amount set individually by the issuer are accepted by the replenishment instruction control unit 150 through the issuer server 20 and the like, and the information on the replenishment amount is accumulated in the value DB151, and the specific replenishment requisite is kept recorded in the value grant condition DB152.

In the case of replenishment by the individual, for example, as shown in FIG. 12, the replenishment can be performed by operating the home terminal device 60 by the individual. In the electronic money management server 10, the identification information on the individual, the identification information (or user name) on the replenishment-target user card, and the deposit money amount are accepted by the replenishment instruction control unit 150, and are recorded in the value DB151. Further, the cash corresponding to the deposit money amount from the individual is accepted through the banking system 70 and the like (account management computer 40).

In case the home terminal device 60 of the individual is connected with the IC card reader/writer 62 and the individual retains the user card UC, by the transfer of the electronic money from the user card UC, the replenishment of the electronic money to other user cards UC of replenishment targets can be also performed. In this case, the individual is put into the same status as utilizing the on-line of the electronic money to be described later.

When it is detected that any of the deposit money terminal devices 30 is loaded with the user card UC (for example, at the card certifying time and the like) and it is confirmed by the replenishment instruction management unit 150 that the card is a card matching the specific replenishment requisite or the user card UC of the replenishment target instructed by the individual, the replenishment instruction management unit 150 reads and informs the information on the replenishment amount from the value DB151 to the deposit money terminal device 30. In this manner, the electronic money of the replenishment amount is replenished in the user card UC through the deposit money terminal device 30.

In case the user card UC of the replenishment target is not detected even after the lapse of the predetermined period of time after accepting the replenishment instruction from the third party and the issuer, the electronic management server 10 returns the replenishment instruction and the replenishment amount to the accepter.

Further, in the case of the replenishment of the electronic money by the intention of the third party, since it is an ordinary case that the user does not know his own user card UC is replenished with the electronic money, when the replenishment instruction is accepted, the replenishment instruction management unit 150 may be added with a function to inform the issuers by an electronic mail and the like. However, in case such service is made available, it is necessary to acquire in advance the mail address of the user retaining the user card UC of the replenishment target through the third party or the user.

[Deposit Money Management Processing]

Figure 14:
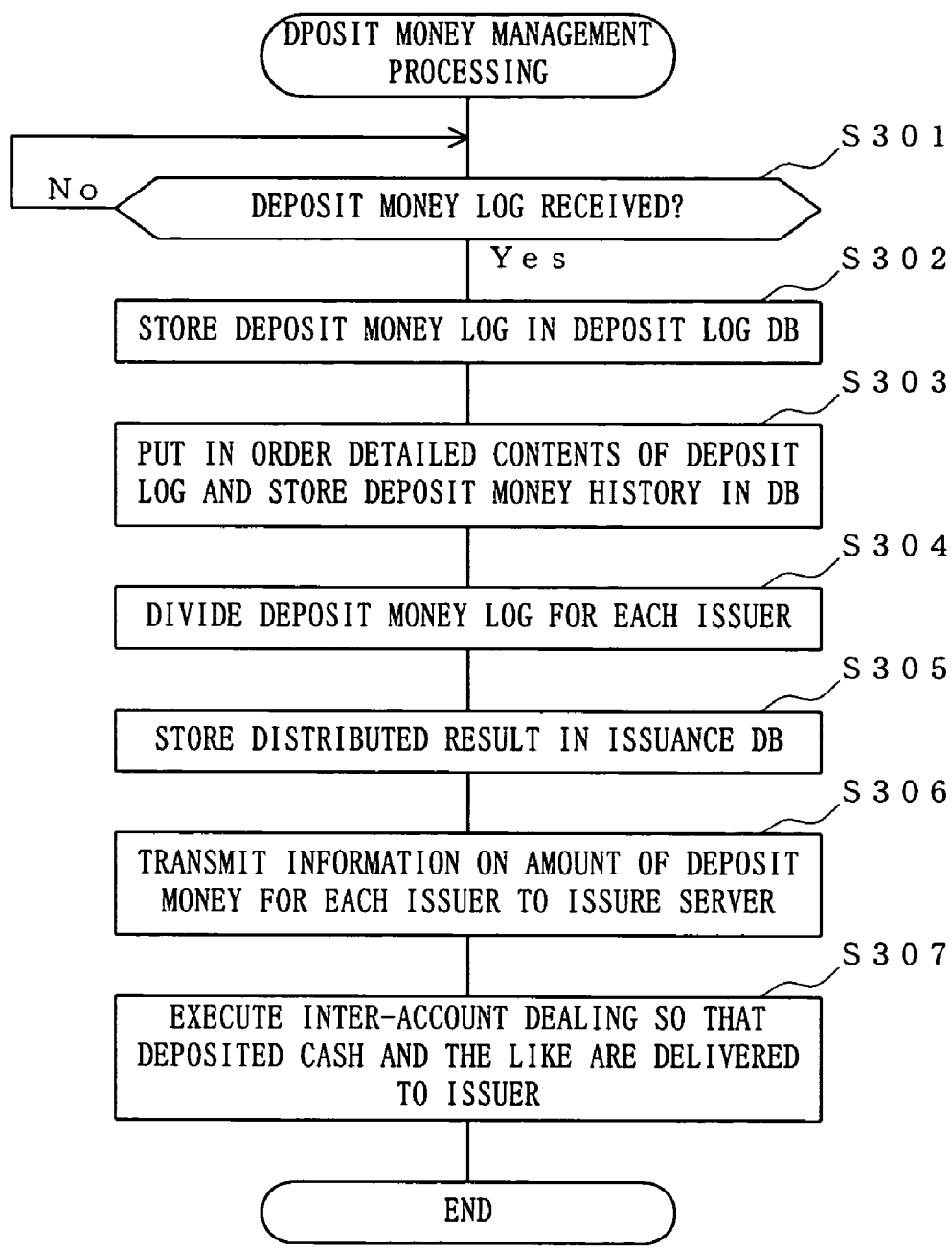
FIG. 14 is a procedure explanatory view of a deposit money management processing by an electronic money management server.

Next, the deposit money management processing in case the user card UC is actually replenished with the electronic money will be described. The procedure of this processing is as shown in FIG. 14. As described above, when the electronic money is replenished by the deposit money terminal device 30, the deposit money log is delivered to the electronic money management server 10 from the deposit money terminal device 30. Further, in case the replenishment instruction is received from the issuer or the individual, and is executed (in case the user card UC is detected, and is replenished with the electronic money), a part or the whole of the deposit money log exists in the electronic money management server 10.

In case the user card UC is replenished with the electronic money in this manner, the fact of the replenishment, the information to specify the user card UC of the replenishment target and the issuer of the electronic money, and the information showing the amount of the deposit money are all traceable in the electronic money management server 10. Hence, the electronic money management server 10 takes the initiative in performing the deposit money management processing by the following procedure.

First, when the deposit money logs are collected by the deposit money control unit 110, these logs are stored in the deposit money log DB112 (step 301: Y and step 302). The deposit money log DB 112 is usually stored with the deposit money logs for one day within the day when the dealings have been conducted. The collected deposit money logs, as the need arises, are subjected to the detection of malfunction and errors of the deposit money terminal device 30, the detection of systems registration slippage, detailed audit including confirmation of operation or, transaction status in the deposit money management unit 110.

In the card information management unit 130, from among pieces of the identification information B01 included in the deposit money logs, the detailed contents of the deposit money logs are put in order for each issuer ID, card issuance organization ID, and serial number, and the record provided for each user card UC by the card information DB 131 is stored with the amount of the deposit money, the date and hour of the deposit, and the replenished terminal device ID (the deposit money history) (step 303).

When these processings are completed, the issuer management unit 120 totalizes or distributes (step 304) the deposit money logs for each user card UC with the issuer ID within the identification information B01 as a retrieval key, and allows the result to be stored within the issuance management DB122 (step 305).

When the totalizing or distributing processing for each issuer is completed, the issuer management unit 120 transmits at least the information on the amount of the deposit money from among the deposit money logs for each issuer stored in the issuance management DB122 to the issuer server 20 of the issuer (step 306). Further, in order that the cash corresponding to the distributed deposit money log is delivered to the issuer, the issuer management unit 120 controls the account computer 40 of the main bank and the baking system 70 and the like (step 307).

In the issuer sever 20, when the deposit money log is received, it is stored in the deposit money log DB202A by the deposit money performance management 202, and at the same time, the money account of the user card UC specified by the identification information B01 included in the deposit money log is deposited with the deposit money. The deposit money performance management unit 202 retrieves the account DB205, and confirms whether or not the amount corresponding to the deposit money log is actually remitted from the electronic money management company, and if the remittance is made, the processing for the deposit money is completed.

When the electronic money is replenished in some user card UC by the intention of the issuer, in case the replenished amount is recognized by the user, it is not always necessary the perform the confirmation processing for the amount of the deposit money by the issuer in the deposit money settlement processing.

In case the electronic money is replenished in the user card UC by the intention of the individual other than the user, the processing is different only in that the received cash and the like is delivered to the issuer from the electronic money management server 10.

As can be appreciated from the above explanation, from whichever issuer the electronic money is issued or from whichever deposit money terminal device 30 it is issued, and further, whatever card the user card UC of the replenishment target is, when the electronic money is replenished, the deposit money log is collectively gathered into the electronic money management server 10. Since the deposit money log contains the information on the cash corresponding to the replenished electronic money and the issuer ID and the card ID, the cash utilized for replenishment of the electronic money is totalized by the electronic money management server 10 for each issuer, and the totalized cash can be remitted to each issuer. In fact, the remittance can be easily made by the account management computer 40 of the main bank and the baking system 70 and the like. In this manner, it is guaranteed that the user card UC is replenished with the electronic money, and the user can use the user card UC as a prepaid card.

[Utilization 1 of Electronic Money]

Figure 15:
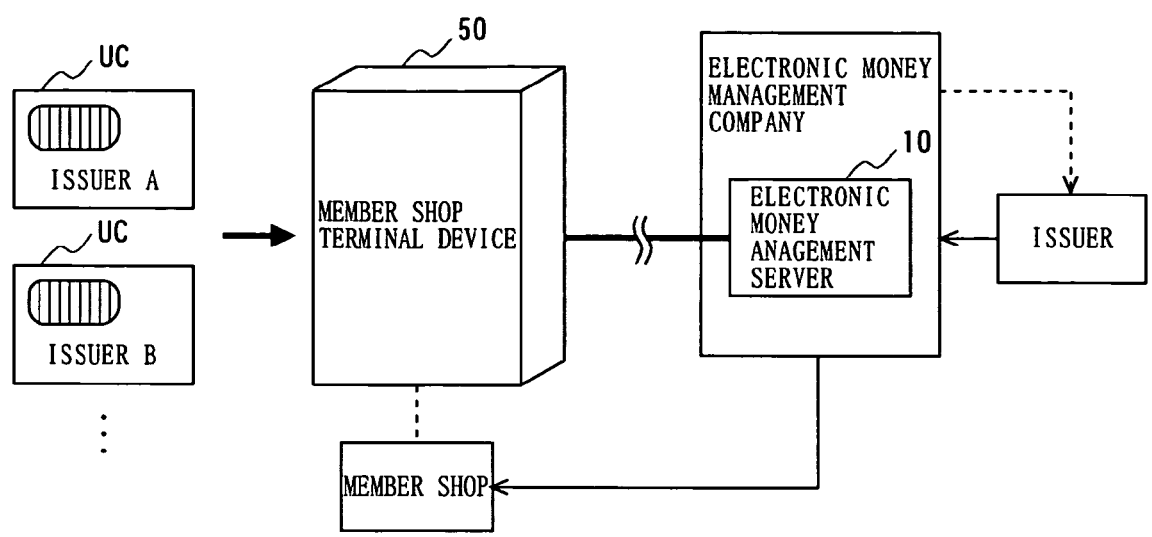
FIG. 15 is a conceptual illustration of the utilizing mode of the electronic money.

Next, the utilization mode of the electron money, for example, the mode in the case of the payment by the user of the electronic money as counter of commodity purchase or enjoyment of services will be described. The electronic money, as shown in FIG. 15, is utilized in the member shop, and is reduced from the user card UC in the member shop terminal device 50 installed by the member shop. The information to the effect that the electronic money is utilized is gathered in the electronic money management server 10.

Figure 16:
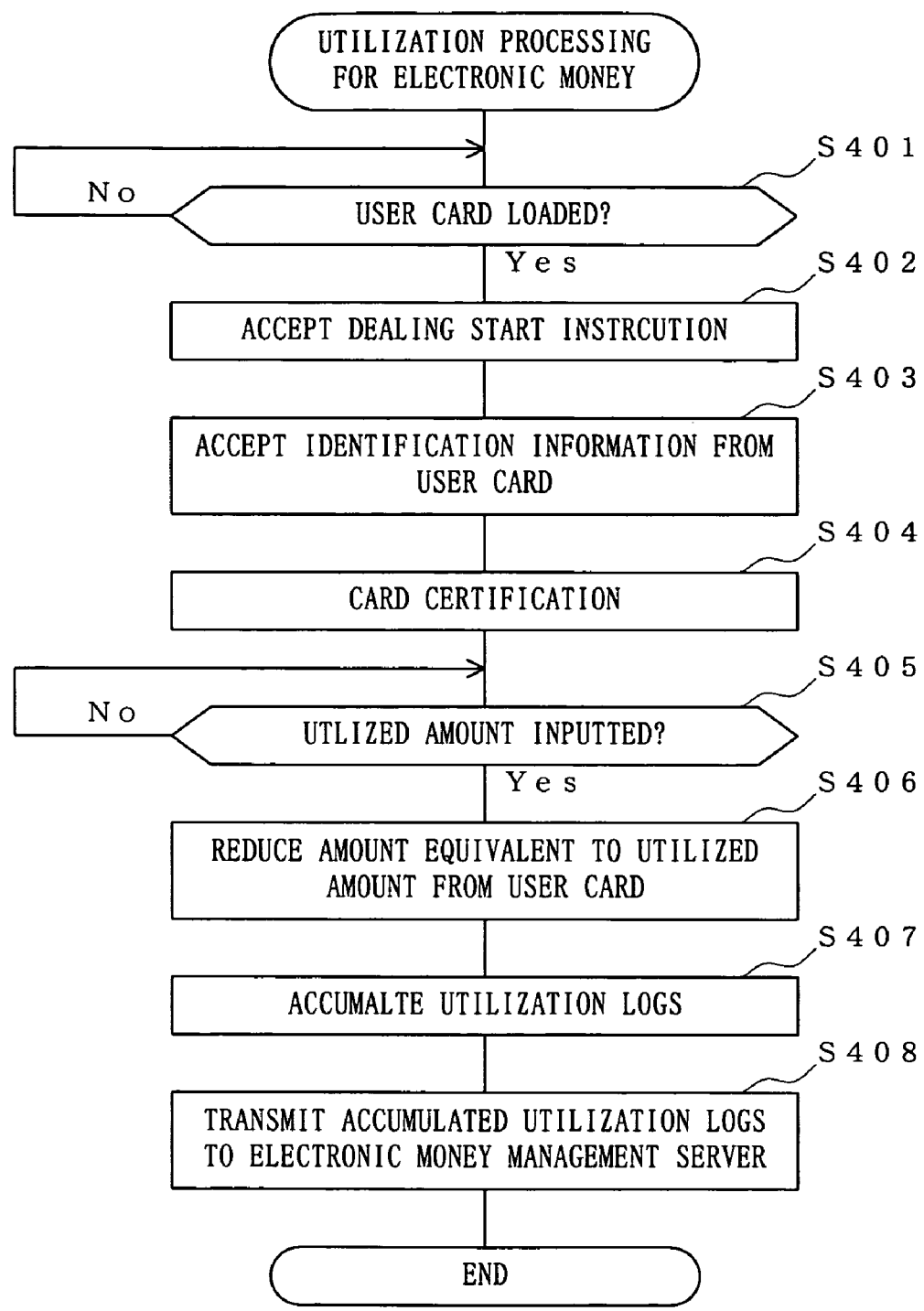
FIG. 16 is a procedure explanatory view of the utilizing processing in the member store terminal device.
Figure 17:
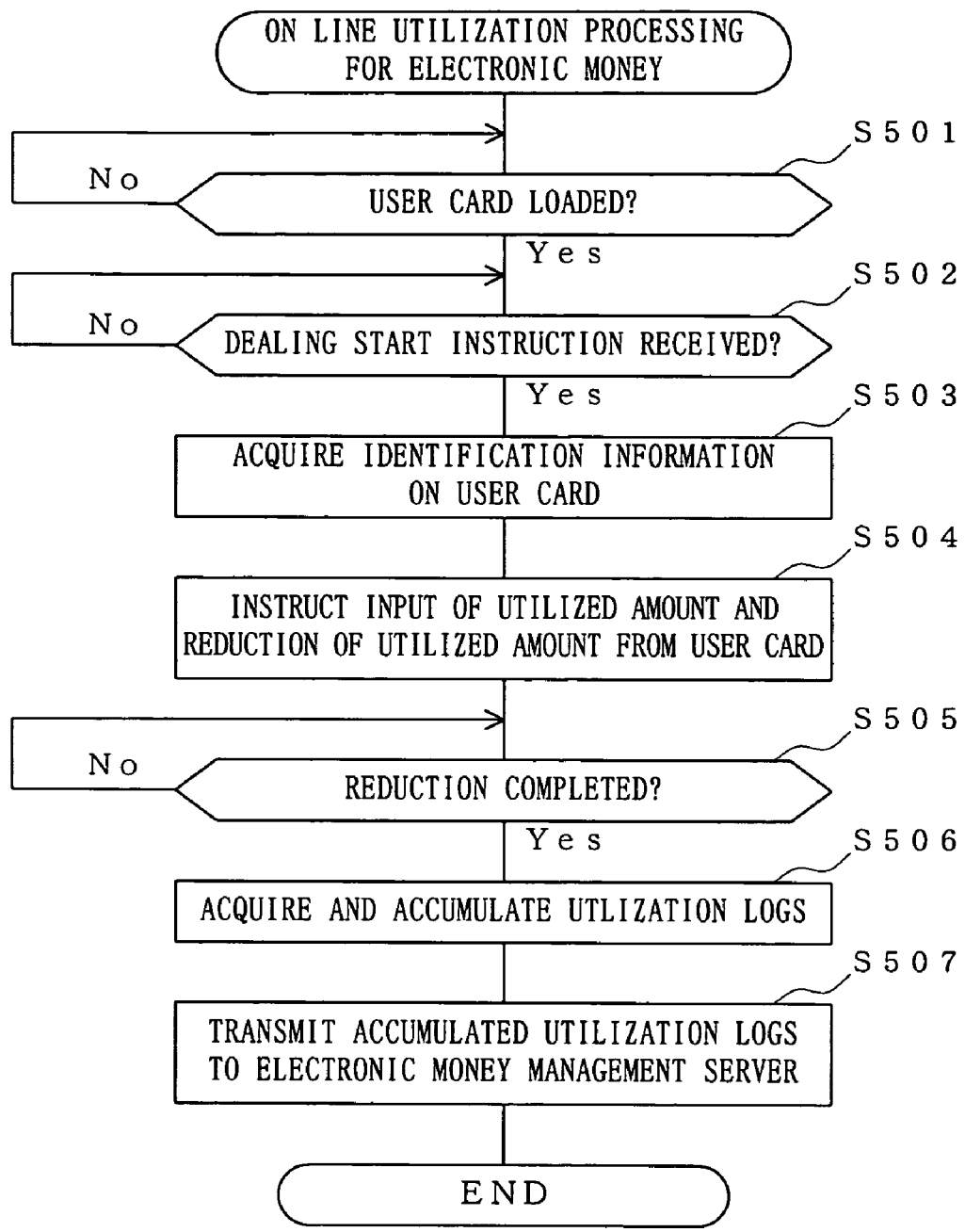
FIG. 17 is a procedure explanatory view of the utilizing processing in the home terminal device.

To be, more specific, the utilization processing is performed by the procedure shown in FIG. 16.

When the user card UC is put into a state capable of communicating with the IC card reader/writer 502 of the member shop terminal device 50, for example, loaded into the IC card reader/writer 502 (step 401:Y), for example, the clerk of the member shop operates the operation unit 506 and instructs the start of the dealings (step 402). The control unit 501 controls the IC card reader/writer 502 and reads the identification information B01 from the user card UC (step 403), and at the same time, allows the IC card certifying unit 503 to perform the card certification (step 404). In case the card is an authentic user card UC, the control unit 501 waits until a utilization amount is inputted from the operation unit 506. When the utilization amount is inputted from the operation unit 506 (step 405:Y), the control unit 501 controls the IC card reader/writer 502, and reduces a utilized amount portion from the balance data recorded in the EEPROM 1004 of the user card based on the utilization amount (step 406), and at the same time, allows the storage unit 507 to be stored with the money amount, the identification information, information on the utilized date and hour, and the member shop terminal device ID as an utilization log (step 407). The information on the utilized date and hour is acquired from the timer unit 509. The control unit 501 accumulates the utilization logs for a fixed period of time, and at the same time, transmits the accumulated utilization logs to the electronic money management server 10 through the communication interface 508 according to the schedule set up individually with the electronic money management company (step 408).

[Utilization 2 of Electronic Money]

An example in a case where the user utilizes the electronic money by using the home terminal device 60 in the cyber member shop (member shop terminal device 50) will be described. In this case, the IC card reader/writer 62 is loaded with the user card UC, and the dealings are performed by the same procedure as the usual on-line trading. The procedure in this case will be described revolving around the processing procedure of the member shop terminal device 50 of FIG. 17.

When the user card UC is put into a state capable of communicating the user card UC with the IC card reader/writer 62 of the home terminal device 60, for example, the user card UC is loaded into the IC card reader/writer 62 (step 501:Y), and the start of the dealings is instructed by the user (step 502:Y), the identification information B01 recorded in the user card UC through the IC card reader/writer 62 and the home terminal device 60 is acquired (step 501 to step 503).

When the cyber member shop (member shop terminal device 50) performs the card certification of the user card UC based on this identification information B01 and confirms that it is an authentic card, the cyber member shop instructs the home terminal device 60 to input the utilized amount of the money and reduce the amount of the electronic money (step 504).

The home terminal device 60 accepts the input of the utilized amount of the money, and controls the IC card reader/writer 62, and renews the amount so that the utilized amount portion is reduced from the balance data recorded in the user card UC. In case the renewal is normally completed (step 505:Y), the user card UC is recorded with a reduction check-off code, and an utilization log of the same content as described above is generated. This utilization log is transmitted to the cyber member shop (member shop terminal 50).

The cyber member shop (member shop terminal device 50) accumulates the acquired utilization log for a fixed period of time (step 506), and transmits the accumulated utilization logs to the electronic money management server 10 through the communication interface 508 according to the schedule set individually with the electronic money management company (step 507).

[Settlement Management Processing]

Figure 18:
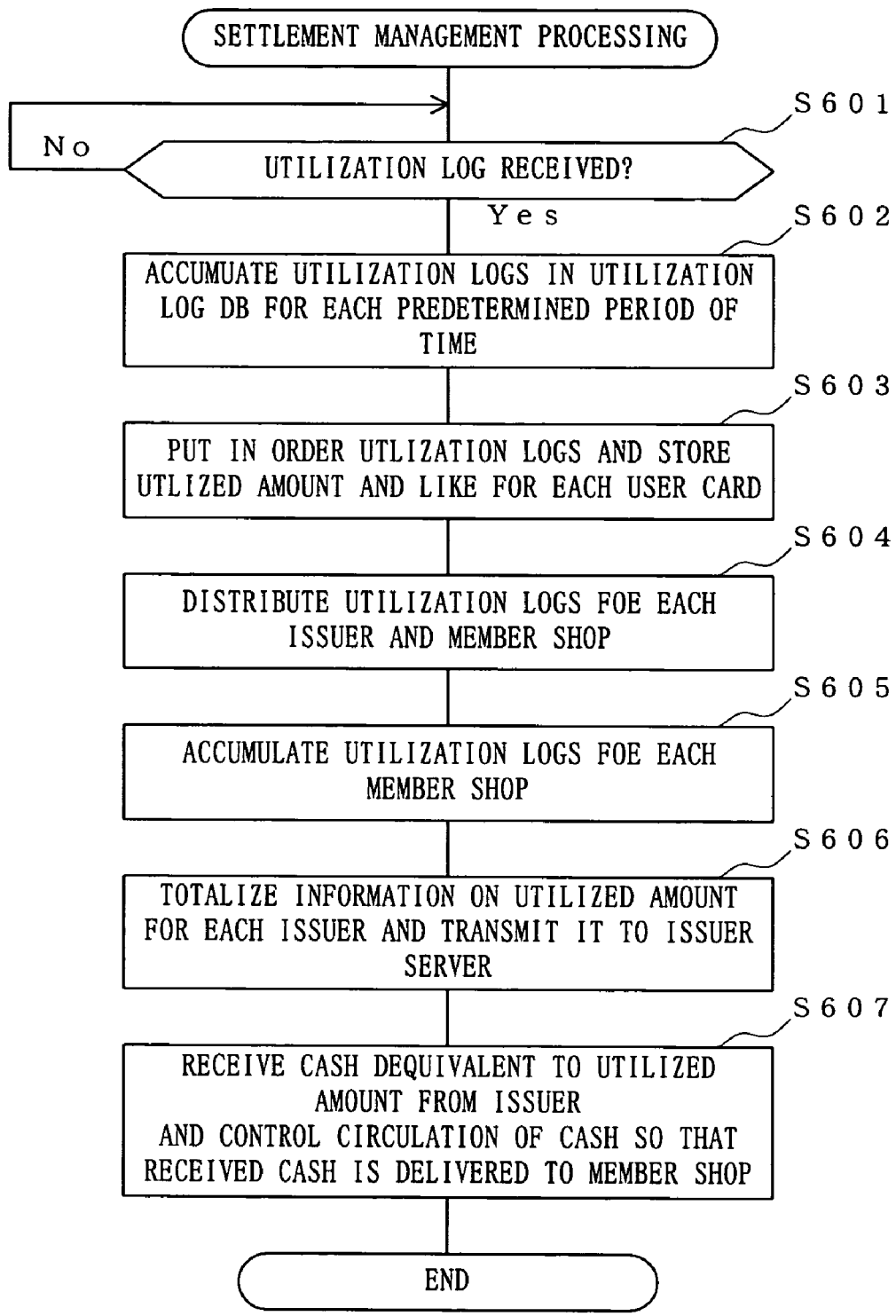
FIG. 18 is a procedure explanatory view of a settlement managing processing by the electronic money management server.

As described above, when the user utilizes the electronic money, even in case from whichever member shop it is utilized, the utilization logs are gathered into the electronic money management server 10. The electronic money management server 10 performs the settlement processing as shown in FIG. 18 based on these utilization logs.

That is, in case the utilization logs are received, the member shop management unit 140 stores these utilization logs in the utilization log DB142 for each fixed period of time (step 601:Y and step 602). These utilization logs, as the need arises, are subjected to the detection of terminal malfunction or errors, the detection of systems registration slippage, and detailed audit including confirmation of operation or transaction status in the member shop management unit 140.

The card information management unit 130 puts in order the utilization logs for each issuer ID within the identification information BD01, card issuance organization ID, and serial number, and stores the utilized amount, date and hour of the utilization, and the member shop terminal device ID in the record for each user card of the card information DB131 (step 603).

Further, the card information management unit 130 distributes the utilization logs by the issuer management unit 120 for each issuer with the issuer ID taken as a retrieval key, and further, distributes the utilization logs by the member shop management unit 140 for each member shop (step 604). The utilization log for each member shop is stored in the utilization log DB142 (step 605). The information regarding at least the utilized amount from the utilization logs distributed for each issuer is totalized, and this total amount is transmitted to the issuer server 20 of the issuer (step 606).

In the issuer server 20 having received the information on the utilized amount, this information is stored in the utilization log DB203A by the utilization performance management unit 203. Further, the utilization performance management unit 203 withdraws the utilized amount from the money account specified by the identification information B01 within the account DB205 corresponding to the receipt and payment management unit 204, and performs a processing to make remittance of the utilized amount to the electronic money management company according to the date and time individually set with the electronic money management company. The remittance processing, for example, is performed in such a manner that the receipt and payment management unit 204 having received the instruction from the utilization performance unit 203 performs a transfer from own bank account to the account management computer 40 of the main bank through the baking system 70 and the like. When it is evident in this manner that the cash equivalent to the utilized amount is deposited to the electronic money management company from each issuer, the electronic money management server 10 controls cash circulation so that the deposited cash is delivered to the member shop where the electronic money is utilized (step 607). To be specific, for example, the settlement management unit 180 of the electronic money management server 10 issues a transfer instruction to the bank account of each member shop from own account through the banking system 70 and the like for the account management computer 40 of the main bank according to the utilization log for each member shop stored in the utilization log DB142, so that the cash of the utilized amount portion is delivered to the member shop.

As can be appreciated from the above explanation, from whichever issuer the electronic money is issued or in whichever user card UC it is recorded, and further, in whichever member shop it is utilized (including automatic vending machine), when the electronic money of the utilized amount portion is reduced from the user card UC, the utilization logs including the information on the issuer ID, the card ID and the utilized amount are collectively gathered into the electronic money management server 10.

In the electronic money management server 10, the utilized amount contained in these utilization logs are distributed and totalized for each issuer and member shop, and a control for inter-account dealings is performed for the issuer so that the cash of the utilized amount after the totalizing is received and the received dash is delivered to the member shop where the electronic money is utilized. In this manner, the settlement processing for the cash in case of utilizing the electronic money can be reliably performed.

In the present embodiment, though an example in case of using the IC card as the recording medium to record the electronic money has been shown, it goes without saying that other card mediums mounted with an IC chip having a recording area, for example, a hybrid card may be used. Further, a mobile phone, a wrist watch storing such an IC chip and other portable mediums mounted with the IC chip can be used. These IC chips are issued for each issuer.

What is claimed is:

1. An electronic money management system for communication via a communication path with one or more electronic money replenishing means for replenishing with electronic money a portable recording medium containing recording medium identification information to identifying the portable recording medium and issuer identification information identifying an issuer of the electronic money among issuers of electronic money, the electronic money management system comprising:

information acquiring means for acquiring from the one or more electronic money replenishing means via the communication path the recording medium identification information, the issuer identification information, and electronic money replenishment information corresponding to an amount of the electronic money with which the portable recording medium is replenished; and deposit money management means for specifying the issuer of the electronic money in accordance with the issuer identification information acquired by the information acquiring means, storing a deposit money log generated by the electronic money replenishing means and containing information corresponding to the electronic money replenishing information and the recording medium identification information, calculating for each electronic money issuer a total monetary value of the electronic money in accordance with the information contained in the deposit money log, and delivering the calculated total monetary value to the corresponding electronic money issuer.

2. An electronic money management system according to claim 1; further comprising replenishment instruction accepting means for accepting a replenishment instruction corresponding to the replenishment of the portable recording medium with electronic money and the total monetary value of the electronic money, and replenishment instruction management means for transmitting the accepted replenishment instruction to the electronic money replenishing means via the communicating path.

3. An electronic money management system for communication via a communication path with one or more electronic money replenishing means for replenishing with electronic money a portable recording medium containing recording medium identification information identifying the portable recording medium and issuer identification information identifying an issuer of the electronic money among issuers of electronic money, and for communication via the communication path with one or more electronic money reducing means for reducing a monetary value of electronic money in the portable recording medium that is used in a member shop terminal device, comprising:

first information acquiring means for acquiring from the one or more electronic money replenishing means via the communication path the recording medium identification information, the issuer identification information, and electronic money replenishment information corresponding to an amount of the electronic money with which the portable recording medium is replenished;

second information acquiring means for acquiring the medium identification information and the issuer identification information contained in the portable recording medium, acquiring member shop identification information identifying the member shop terminal device, and acquiring from the one or more electronic money reducing means via the communication path electronic money reduction information corresponding to an amount of electronic money by which the monetary value of the electronic money is reduced;

deposit money management means for specifying the issuer of the electronic money in accordance with the issuer identification information acquired by the first information acquiring means, storing a deposit money log generated by the electronic money replenishing means and containing information corresponding to the electronic money replenishing information and the recording medium identification information, calculating for each electronic money issuer a total monetary value of the electronic money in accordance with the information contained in the deposit money log, and delivering the calculated total monetary value to the corresponding electronic money issuer; and settlement management means for specifying the issuer of the electronic money and the member shop terminal device in accordance with the issuer identification information and the member shop identification information, respectively, acquired by the second information acquiring means, specifying the electronic money monetary value in accordance with the electronic money reduction information acquired by the second information acquiring means, calculating for each electronic money issuer a total monetary value of the electronic money in accordance with the information contained in the deposit money log, calculating for the member shop terminal device a total monetary value in accordance with the electronic money reduction information, and delivering the calculated total monetary values between the issuer and shop.

4. An electronic money management system according to claim 3; wherein any one of the deposit money management means and the settlement management means delivers the monetary value via inter-account transactions between preselected monetary institutions.

5. An electronic money management system according to claim 3; further comprising replenishment instruction accepting means for accepting a replenishment instruction corresponding to the replenishment of the portable recording medium with electronic money and the total monetary value of the electronic money, and replenishment instruction management means for transmitting the accepted replenishment instruction to the electronic money replenishing means via the communicating path.

6. An electronic money management system according to claim 3; further comprising recovering management means for performing a recovery for the portable recording medium where the electronic money replenishment is not completed.

7. An electronic money management system according to claim 3; further comprising history management means for recording a replenishment history of the electronic money replenished in the portable recording medium and linking the replenishment history with the recording medium identification information, thereby enabling the electronic money management system to acquire an utilization status of the portable recording medium.

* * * * *